(12) United States Patent  (10) Patent No.: US 8,562,264 B2
Winsor  (45) Date of Patent: Oct. 22, 2013

(54) RESTRAINT DEVICE FOR A TIRE

(75) Inventor: Robert B. Winsor, Montreal (CA)

(73) Assignee: Holden America, Inc. (CA)

(*) Notice: Subject to any disclaimer, the term of this patent is extended or adjusted under 35 U.S.C. 154(b) by 97 days.

(21) Appl. No.: 13/241,649

(22) Filed: Sep. 23, 2011

(65) Prior Publication Data

US 2012/0080576 A1   Apr. 5, 2012

Related U.S. Application Data

(63) Continuation-in-part of application No. 12/012,444, filed on Jan. 30, 2008.

(51) Int. Cl.
B60P 7/08 (2006.01)
B60C 99/00 (2006.01)

(52) U.S. Cl.
USPC ........................................ 410/30; 248/346.03

(58) Field of Classification Search
USPC ........... 410/7, 9, 19, 49, 30; 248/346.03, 500; 188/36
See application file for complete search history.

(56) References Cited

U.S. PATENT DOCUMENTS

| 5,302,063 | A | * | 4/1994 | Winsor | 410/30 |
| 5,312,213 | A | * | 5/1994 | Winsor | 410/9 |
| 6,835,034 | B2 | * | 12/2004 | Winsor | 410/30 |
| 7,044,698 | B2 | * | 5/2006 | Winsor | 410/30 |
| 7,150,592 | B2 | * | 12/2006 | Anderson et al. | 410/30 |

* cited by examiner

Primary Examiner — Glenn Dayoan
Assistant Examiner — Sunsurraye Westbrook
(74) Attorney, Agent, or Firm — Ice Miller LLP

(57) ABSTRACT

A restraint device for securing a tire to an apertured surface and which fits in a safe space under a vehicle includes a base, a support, an abutment and an activation system. The base secures the restraint device to an apertured surface. The abutment, which is attached to the support, which in turn is slidably attached to the base, is moved into engagement with the tire using the activation system to prevent movement of the tire. The activation system has a rotational device such as a lever. The abutment may have a wedge shaped lateral support, and a positioning spring to maintain the abutment in a retracted or extended position. The restraint device may have an indicator to show that the device is properly set in the apertured surface, and a handle that collapses into the safe space when not in use.

14 Claims, 31 Drawing Sheets

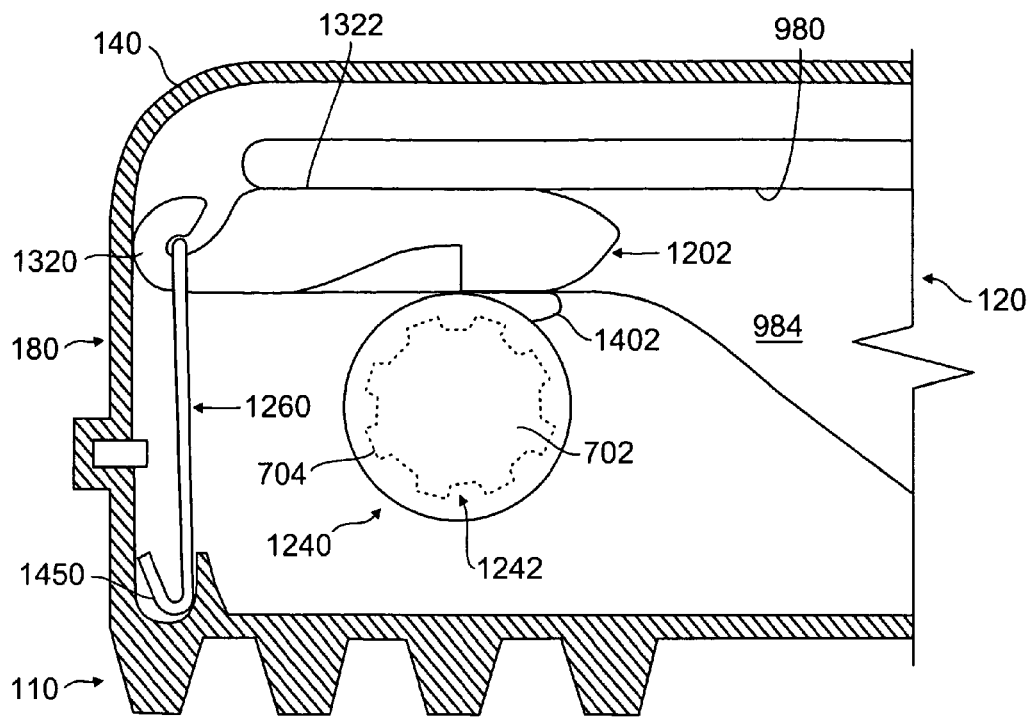
FIG. 12
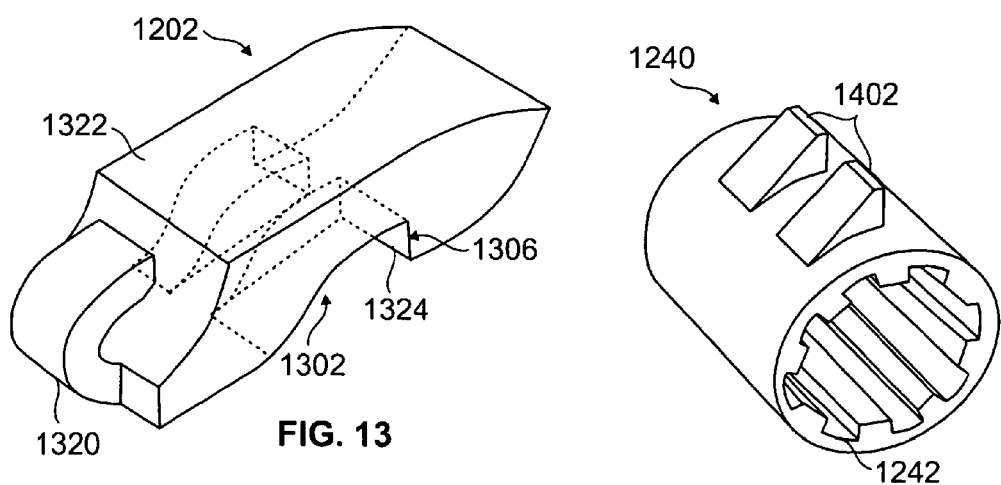
FIG. 13
FIG. 14

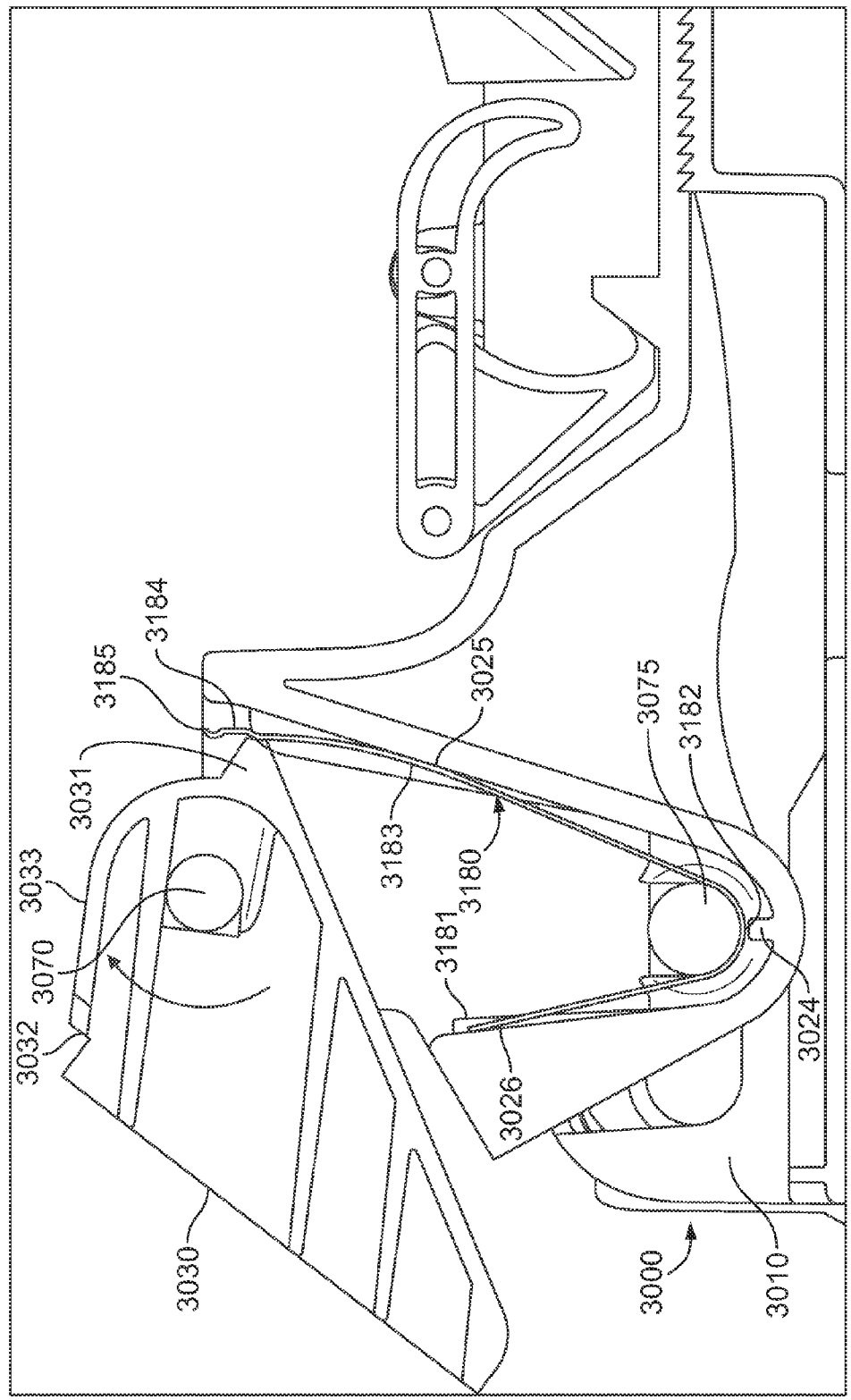

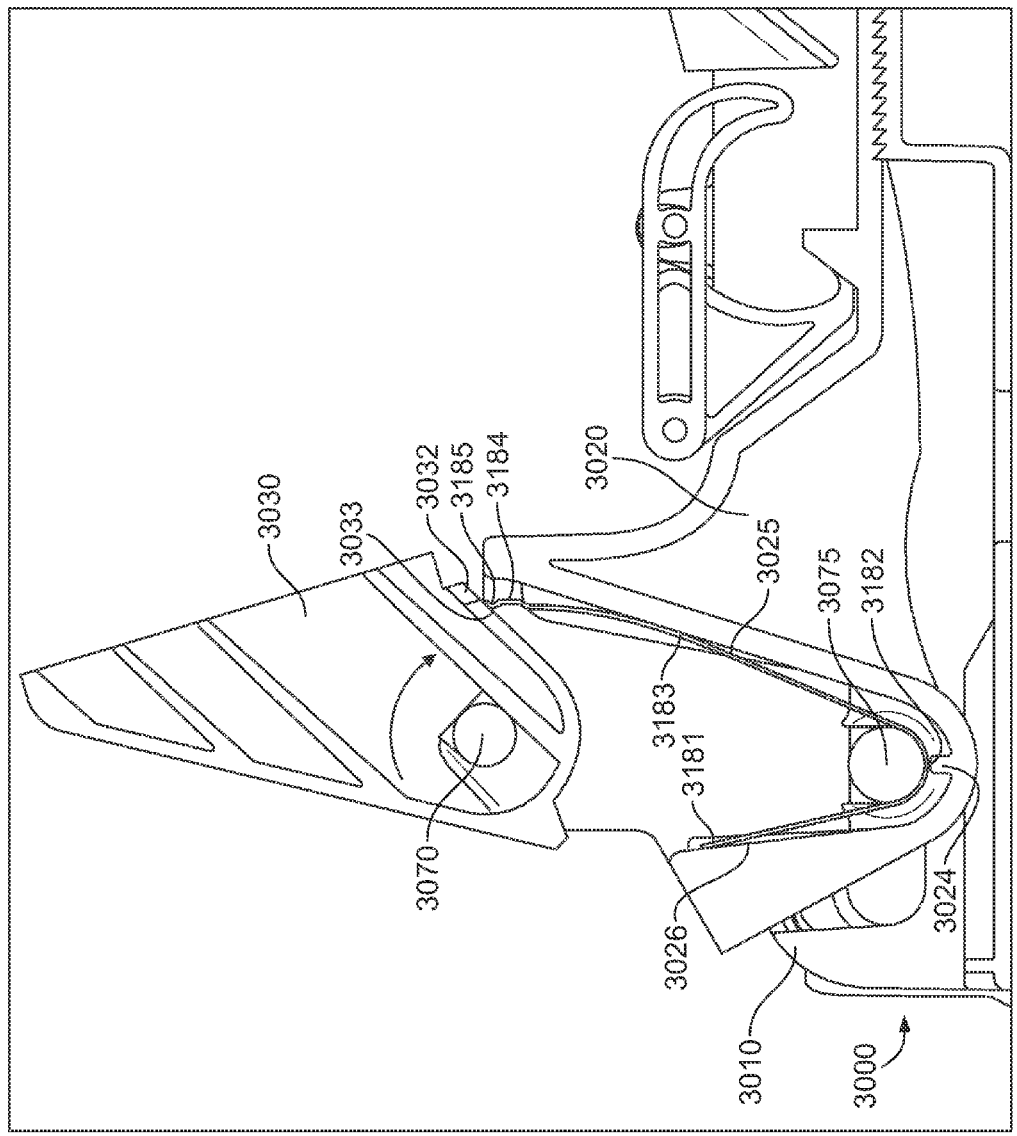

RESTRAINT DEVICE FOR A TIRE

This application claims priority as a continuation-in-part of U.S. application Ser. No. 12/012,444, filed Jan. 30, 2008.

BACKGROUND

There are many situations in which the curved side of a cylindrical object needs to be secured to a surface. For example, barrels, such as those holding wine, may be kept on their sides. In another example, large rolls of paper and metal may be stored on their sides for easier access by automated machinery. The issue of how to secure cylindrical objects on their sides, particularly very large objects, can be quite complex. If the object is to be secured to a moving object, the issue becomes even more complex.

For example, vehicles, such as cars, vans, trucks and other wheeled modes of transport are often secured to a surface by limiting the motion of their wheels. One method of limiting the motion of the wheels is by the use of a restraint device such as a chock. Chocks have been used to secure vehicle tires in many situations, such as in garages, parking lots and on transport carriers. Such transport carriers include, for example, trains and trucks.

To transport carriers, the vehicles are often loaded onto a surface, such as a floor of the transport carrier. The surfaces of some transport carriers include holes or apertures to facilitate the attachment of restraint devices. In the case of double-deck railcars, such as those used in North America to transport carriers, the decks are covered with a grating to maximize the number of apertures. To secure the vehicles to transport carriers, in some cases, chocks are secured to the apertures provided. For example, in some cases, restraint devices such as chocks, are secured to the deck grating adjacent the tires of the vehicles. The chocks are secured to the grating as close as practical. Some chocks are generally placed either fore or aft of the wheels of one of the vehicle's axles and some are placed in an opposite location relative to the wheels of another axle. Thus, longitudinal motion of the vehicle is reduced or eliminated. In order to laterally secure the vehicles when subjected to transverse displacement forces, the chocks secured to the grating include lateral restraints. The lateral restraints include arms with a paddle-shaped end, which project over the inboard side of the tires. However, when the vehicle is subjected lateral forces, the inboard side of the tire often incurs visible scuffing and/or other damage due to repeated contact with the lateral support.

However, in the case of automobiles, the shape is evolving such that the clearance between the wheels and the adjacent body structures is decreasing. These evolutions include decreasing the space between the wheel well opening and the tire circumference, lowering the underside of the body so that it is increasingly nearer to the ground and moving the suspension components ever closer to the wheels on the inboard side. Accordingly, when the vehicle is subjected to an impact force, the tires compress against the face of the chocks. As a result, the wheels and surrounding body move towards the chocks to the extent that the tire is compressed. When subjected to greater impact forces, the adjacent body parts may collide with the chocks, potentially damaging the vehicle and/or the chock.

Also, the evolution in the vehicle shape adjacent to the wheels results in less and less room for chocks, making it increasingly difficult to insert and apply them. In some cases, the chock will interfere with the automobile's wheel well. These conditions make it increasingly difficult to insert and apply the chocks.

SUMMARY

A restraint device for securing approximately cylindrical objects to an apertured surface is presented. The restraint device generally includes a base, a support, an abutment and an activation system. The restraint device may further include a lateral restraint and a cover. The base, along with the activation system, secures the restraint device to an apertured surface. The abutment, which is placed adjacent the outer edge of the object, acts as a barrier to the object, thus reducing or preventing movement of the object in the direction of the restraint device. The abutment and the support may be moved relative to the base by the activation system. To engage and disengage the restraint device from an apertured surface and the generally cylindrical object, the activation system may include a rotational device such as a lever.

The restraint device may be used to secure a vehicle, such as an automobile, to the grating of a transport carrier. To secure the vehicle, pairs of restraint devices may be placed on opposing sides of all the vehicle's tires. Other arrangements, such as placing a single restraint device in each of the four positions adjacent each rear wheel and each front wheel on the side of the wheels facing outwardly, may be also be used.

In one example, the abutment of the restraint device is in a hinged relationship with the support and can rotate in relation to it. When the abutment is in an upright position, the front of the abutment is positioned to engage the tire. When the abutment is rotated forward and down, the rear side of the abutment is positioned to engage the tire. These configurations can be used to provide restraint for wheels and vehicles of varying sizes while still fitting within the safe zone of the vehicle.

In addition, the restraint device may include a lateral restraint that, when the restraint device is engaged, projects on the outboard side of the tire. However, the lateral restraint engages the tire only at approximately the intersection of the tire tread and the tire wall. Thus, damage to the outboard side of the tire is reduced or eliminated.

The base of the restraint device includes sets of protrusions that engage the retention device with the grating. The base and support form pockets in which the activation system is located. The activation system may include an operating shaft, a latch system, a lifter system, a longitudinal movement system, one or more release wheels. It may also include a kick plate, a rotational device, a second lifter system, and/or a second latch system.

To place the restraint device in engagement with the grating and the tire, the restraint device is placed under the vehicle as close to the tire as possible and so that at least some of the front angled protrusions of the base engage the grating. The back end of the restraint device is lowered onto the grate so that the rear protrusions of the base protrude through the grating. To engage the abutment with the tire and the restraint device with the grating, the rotation device, in the form of a lever, is rotated into a position approximately horizontal with the grating and facing toward the front of the restraint device. This causes the operating shaft to turn and the latching system to engage one or more hooks with the grating, the longitudinal movement system to push the support and thus the abutment into engagement with the tire.

To disengage the abutment from the tire and the restraint device from the grating, the lever is rotated to a position approximately horizontal to the grating and facing away from the rear of the restraint device. This rotates the operating shaft in the opposite direction. This causes the hooks of the linking mechanism to disengage from the grating, the lifter system to lift the support and the longitudinal movement system along with a rearward bias spring to move the abutment away from the tire.

Also presented is a restraint device for securing a tire to an apertured surface with a body capable of being secured on the apertured surface in proximity to a tire of a vehicle; an abutment disposed at a front end of the body and coupled to the body by a hinge, where the abutment may be pivoted to an extended position extending above the body, and a retracted position with a second face extending toward the apertured surface, the abutment in the extended position has a front face configured to engage the tread of a large tire, and the abutment in the retracted position has a rear face configured to engage the tread of a small tire; and a lateral restraint attached to one side of the lateral restraint and configured to prevent lateral movement of the tire; wherein the lateral restraint has a front oblique face extending at an oblique angle from the front face of the abutment toward the tire when the abutment is in the extended position, and a rear oblique face extending at an oblique angle from the rear face of the abutment toward the tire when the abutment is in the retracted position, and wherein the lateral restraint is attached only to the abutment and not to the body. In a further embodiment, the device may have a handle that may be used to lift the device out of engagement with the grating, and to position the device on the grating. The handle collapses to a resting position within the "safe space" of the vehicle.

Also presented is a restraint device for securing a tire to an apertured surface, the device comprising a body capable of being secured on the apertured surface in proximity to a tire of a vehicle; an abutment disposed at a front end of the body and coupled to the body by a hinge, wherein the abutment may be pivoted to an extended position pointing above the body, and a retracted position pointing below the body with a second face extending toward the apertured surface, wherein the abutment in the extended position has a front face configured to engage the tread of a large tire, and the abutment in the retracted position has a rear face configured to engage the tread of a small tire; and a positioning spring attached to the body, wherein the positioning spring is configured to urge the abutment into either the extended position or the retracted position.

Also presented is a restraint device for securing a tire to an apertured surface, the device comprising a body having downwardly depending clamping teeth, the clamping teeth configured to be set inside apertures of the apertured surface; an abutment on the front of the body configured to engage a tread of a tire and prevent the tire from moving on the apertured surface; and an indicating mechanism attached to the body having a retracted position to indicate to an operator that the clamping teeth are not set inside the apertures of the apertured surface, and an extended position to indicate to an operator that the clamping teeth are set inside the apertures of the apertured surface.

BRIEF DESCRIPTION OF THE DRAWINGS

The invention can be better understood with reference to the following drawings and description. The components in the figures are not necessarily to scale, emphasis instead being placed upon illustrating the principles of the invention. In the drawings:

FIG. 12 is a cross-sectional view of a lifter system of the restraint device of FIG. 1.

FIG. 13 is an isometric view of a pawl of the lifter system of FIG. 12;

FIG. 14 is an isometric view of a cam of the lifter system of FIG. 12;

FIG. 31B is a left side cutaway view of the restraint device of FIG. 30 with the abutment in a first intermediate position;

FIG. 31C is a left side cutaway view of the restraint device of FIG. 30 with the abutment in a second intermediate position;

DETAILED DESCRIPTION

Figure 1:
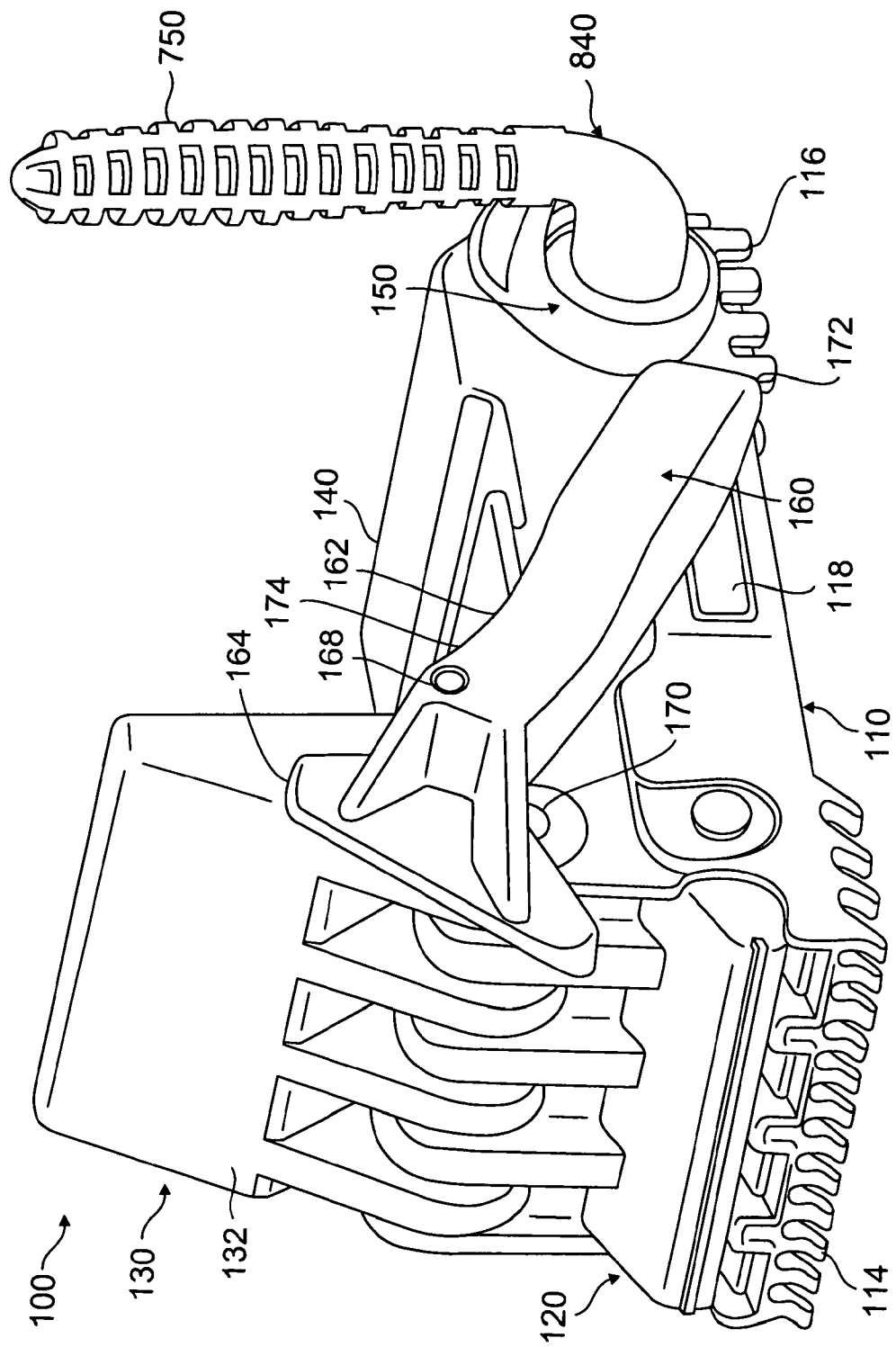
FIG. 1 is a front-left isometric view of a restraint device with an abutment in an upright position.

FIG. 1 illustrates a restraint device 100 for a tire. The restraint device 100 includes a base 110, a support 120, an abutment 130 and an activation system 150. The restraint device 100 may further include a lateral restraint 160 and a cover 140. The base 110, along with the activation system 150, secures the restraint device 100 to an apertured surface. The abutment 130, which is placed adjacent the outer edge of the tire, acts as a barrier to the tire, thus reducing or preventing movement of the tire in the direction of the restraint device 100. The abutment 130 and the support may be moved relative to the base 110 by the activation system 150. The abutment 130 is in a hinged relationship with the support 120 and can rotate forward about rod 170. To engage and disengage the restraint device 100 from an apertured surface and the tire, the activation system 150 may include a lever 750. Throughout this disclosure, including the claims, the conventions that follow will be observed. The front of a restraint device is the side on which the abutment is located, the rear is the opposing side and the left and right sides are determined from a view facing the rear of the restraint device. Further, restraint devices on which the lateral restraint is located on the right side are referred to as a "right-hand" device. Conversely, restraint devices on which the lateral restraint is located on the left side are referred to as "left-hand" devices. Accordingly, the restraint device 100 shown in FIG. 1 is a left-hand device. However, as is shown in FIG. 2, a restraint device 200 may be a right-hand device.

Figure 2:
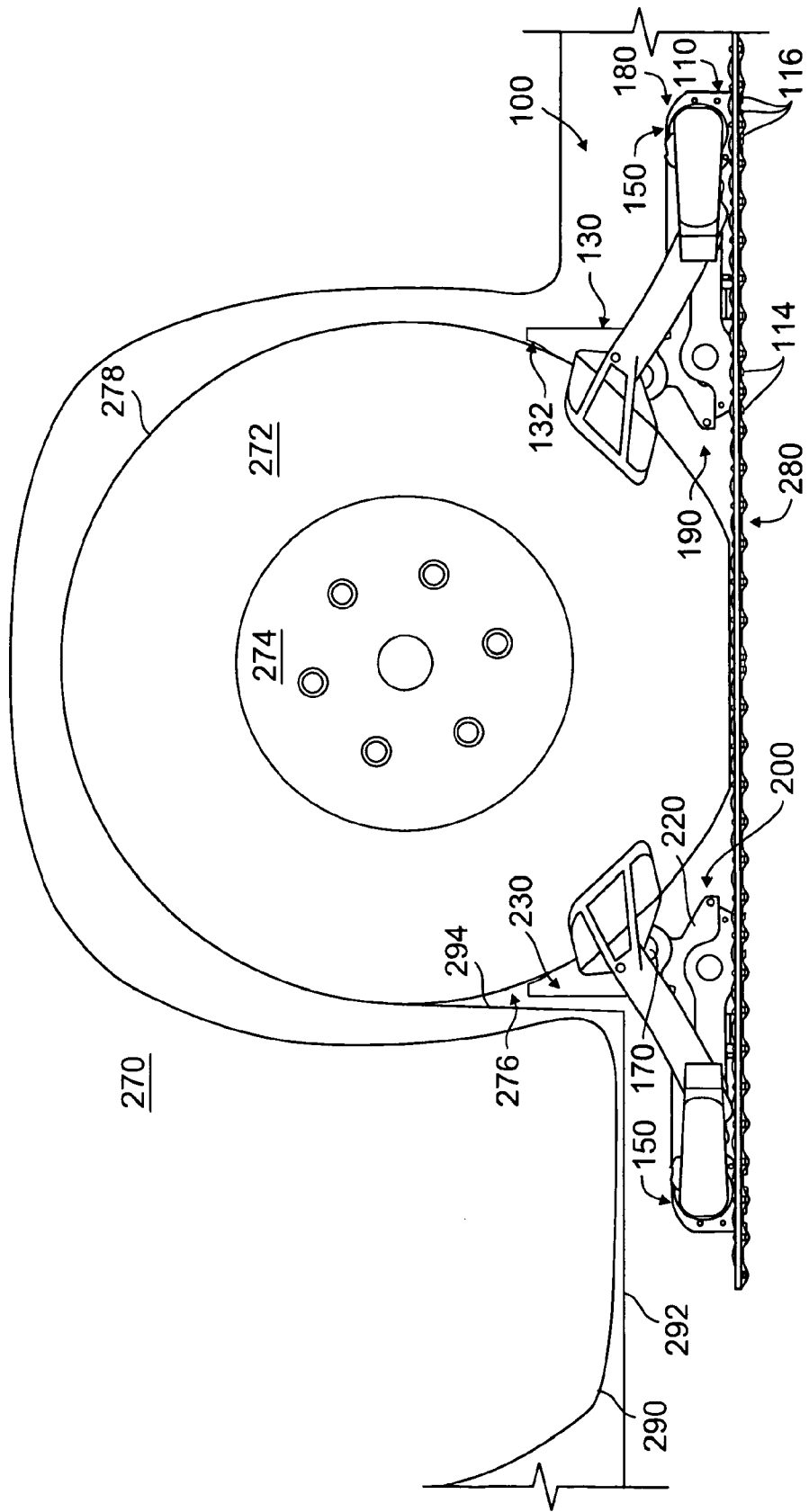
FIG. 2 is a side elevation view of the restraint device of FIG. 1, used in conjunction with a left-hand restraint device and a tire of a vehicle.

As shown in FIG. 2, the restraint device 100 may be used, for example, to secure a vehicle 270, such as an automobile, to the grating 280 of a transport carrier by preventing or reducing the rotational movement or sliding of the vehicle's wheels 274. However, the restraint device 100 is not limited to such an application and may be used to secure other approximately cylindrical objects to other types of apertured surfaces. In the example shown in FIG. 2, the left-handed restraint device 100 and a right-hand restraint device 200 are placed on opposite sides of the tread surface 278 of the tire 272. The right-hand restraint device 200 is a mirror image of the left-hand restraint device 100, but otherwise identical to it. To secure the vehicle, pairs of restraint devices may be placed on opposing sides of all the vehicle's tires as shown in FIG. 2. Alternately, a single restraint device may be placed in each of the four positions adjacent each rear wheel and each front wheel on the side of the wheels facing outwardly. In another alternative, a single restraint device may be located inboard of all four wheels. Other arrangements of restraint devices may be used.

Figure 29:
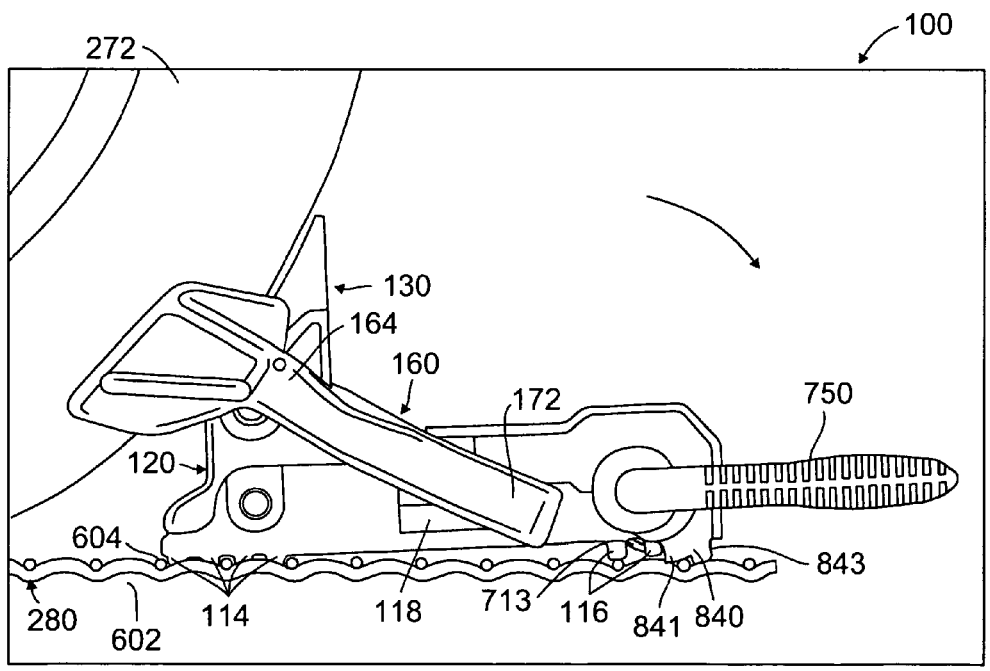
FIG. 29 is a left side view of the restraint device of FIG. 1 in a rear disengaged position.

To place the restraint device 100 in engagement with the grating 280, the lever 750 may start in a position approximately perpendicular to the grating 280, such as is shown in FIG. 1. The restraint device 100 is then placed under the vehicle 270 at an angled position (as shown in FIG. 29) that allows it to be positioned as close to the tire 272 as is possible and so that at least some of the front angled protrusions 114 engage the grating 280. The back end 180 of the restraint device 100 is lowered onto the grate 280 so that the rear protrusions 116 protrude through the grating 280. To engage the abutment 130 with the tire 272 and the restraint device 100 with the grating 280, the lever 750 is rotated into a position approximately horizontal with the grating 280 and facing toward the front 190 of the restraint device 100, such as is shown in FIG. 2. To disengage the abutment 130 from the tire 272 and the restraint device 100 from the grating 280, the lever 750 is rotated to a position approximately horizontal to the grating 280 and facing away from the rear 180 of the restraint device 100, such as is shown in FIG. 29. In addition, the lever 750 may be placed in the approximately horizontal forward-facing position when storing the restraint device 100. Other embodiments of the restraint device 100 may be configured so that the lever 750 or other rotational device starts in and/or moves to positions other than those described above in order to engage and/or disengage the restraint device 100.

To reduce or eliminate the damage that may be inflicted on the vehicle 270 by the restraint device 200, the right-hand restraint device 200 fits within a space referred to as the "safe space" 276. The safe space 276 is the area in which the right-hand restraint device 200 should be located so as not interfere with the fender 290 of the vehicle 270. The safe space 276 is generally defined by a horizontal line 292 under the fender 290 and a vertical line 294 projecting downwardly from the widest point of the tire 278 and ending where it intersects the horizontal line 292. In some cases, the height of horizontal line 292 may be quite low. For example, many participants of the automobile logistics industry have agreed to a standard of approximately 4.5 inches for the horizontal line 292.

Referring to FIGS. 1 and 2, the restraint device 100 is secured to the grating 280 and positioned by its activation system 150 so that the front face 132 of its abutment 130 is adjacent to the tread surface 278 of the tire 272. To enable more effective contact with the tire 272, the front face 132 of the abutment is at an angle relative to the grating 280. For example, this angle may be about 60 degrees. In order to arrest some of the largest commonly used tires, such as those used on larger vehicles, the height of the abutment 130 may need to be at least approximately eight (8) inches and still fit within the safe space 276.

Figure 3:
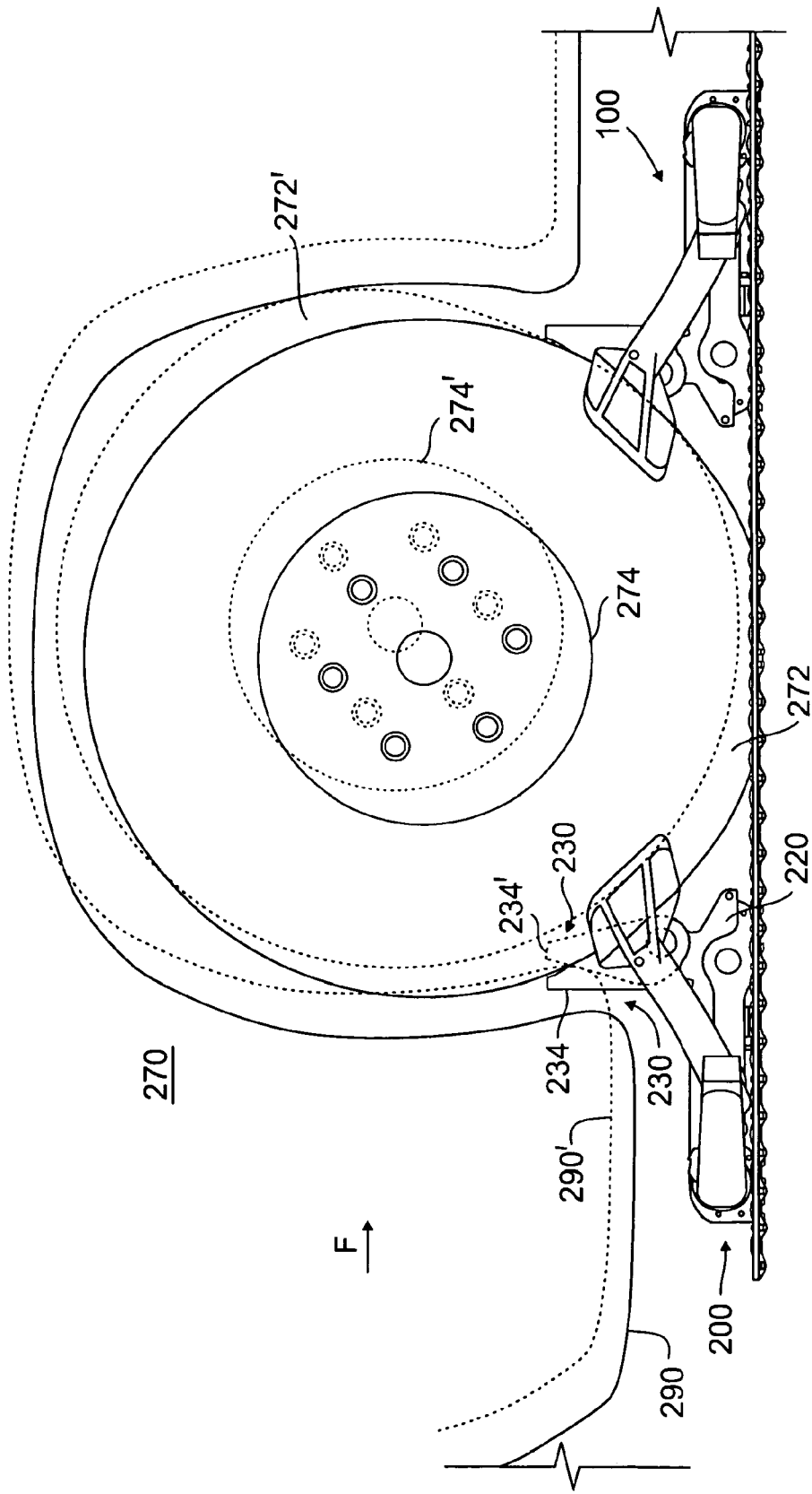
FIG. 3 is a side elevation view of the restraint device of FIG. 1 used in conjunction with another restraint device and the tire of a vehicle as shown in FIG. 2 before and during an impact.

Referring to FIG. 3, because the abutments 130 and 230 and the supports 120 and 220 of the restraint devices 100 and 200, respectively, are in a hinged relationship with each other, damage to the vehicle 270 caused by the restraint devices 100 and 200 during an impact may be reduced or eliminated. In FIG. 3, the solid lines show the tire 272, wheel 274, fender 290 and restraint devices 100 and 200 when undisturbed (just as shown in FIG. 2). In contrast, the dotted lines show these elements at some time during or after which an inertial force F is or has been applied to the vehicle 270. Such a force F may result from something colliding with the transport carrier on which the vehicle 270 is secured. When the force F is experienced by the vehicle 270, the wheel 274', and tire 272' and fender 290' are all shifted in the direction of the force F. Movement of the tire 272', and thus the wheel 274', is impeded by the restraint device 100. However, the fender 290' may move sufficiently to engage the rear face 234 of the abutment 230 of the restraint device 200. Because the abutment 230' is in a hinged relationship with the support 220, it can rotate away from the fender 290'. Thus, any engagement of the fender 290' with the abutment 230' does not result in any significant damage to the fender 290'. When the vehicle 270 stops, the pressure exerted on the tire 272 by the abutment 130 of restraint device 100 causes the tire 272 to move towards the rear of the vehicle 270, which returns the abutment 230 of the restraint device 200 to its original, upright position. Due to the forces applied by the restraint device 100 and 200, the tire 272 eventually returns to approximately the same location from which it started.

Figure 4:
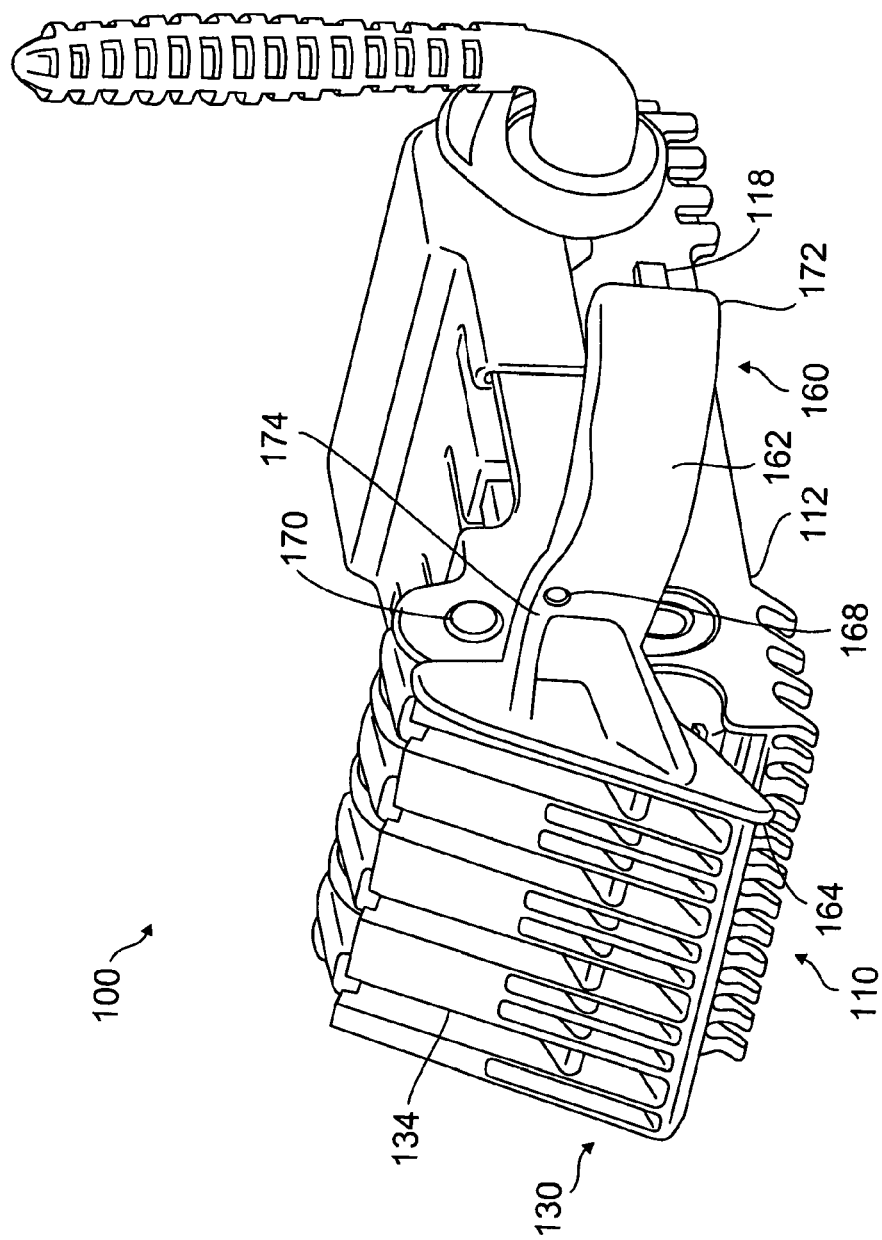
FIG. 4 is a front-left isometric view of the restraint device of FIG.1 with the abutment in a downward position.
Figure 5:
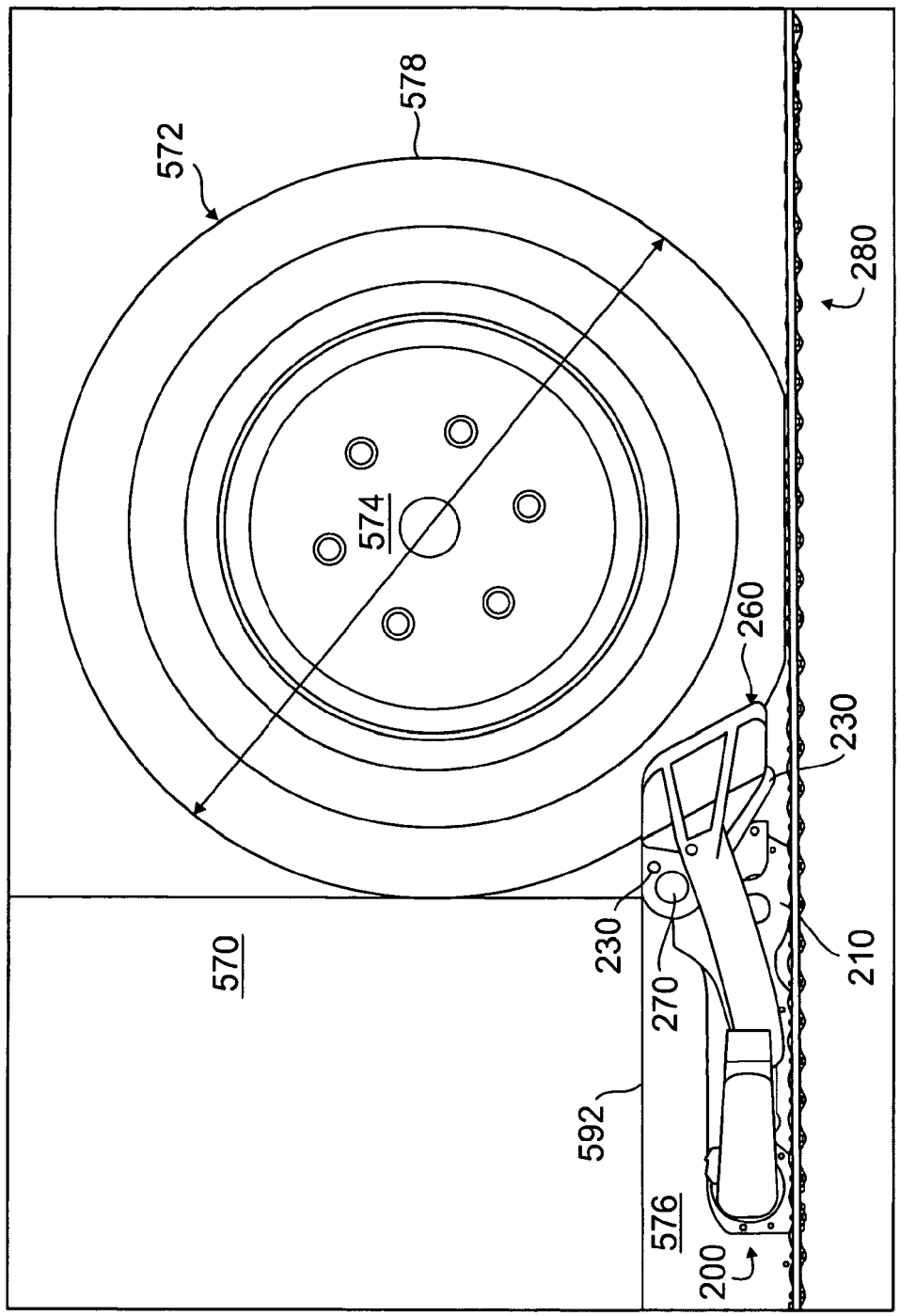
FIG. 5 is a side elevation view of the restraint device of FIG. 4, used in conjunction with the tire of the vehicle.

The abutment 130 of the restraint device 100 may be rotated around rod 170, such that the abutment is extended (extending upward from support 120) or retracted (extending downward from support 120). As shown in FIG. 4 and FIG. 5, such a rotation to the retracted position results in the rear face 134 of the abutment 130 facing toward the tire. The rotation of the abutment 130 also results in the movement of the lateral restraint 160. As shown in FIG. 1, when the abutment 130 is in an extended position, the arm 162 of the lateral restraint 160 is angled upward. When the abutment 130 is rotated into the retracted position shown in FIG. 4, the distal end 164 of the arm 162 also rotates downward. In addition, the proximal end 172 slides along the T-shaped protrusion 118 towards the rear of the restraint device 100.

The rotation of the abutment 130 and the movement of the lateral restraint 160 enables the restraint device 100 to be secured to the grating 280 with the rear face 134 facing the tread surface 578 of the tire 572. This implementation of the restraint device 100 may be used to secure vehicles 570 with smaller tires 572 to the grating 280. Due to the reduced size of the tire 572, the safe space 576 of the vehicle 570 is smaller that that of the vehicle 270 shown in FIG. 2. In some cases, the height of the same space 576 defined by horizontal line 592 may be at most approximately 4.5 inches. However, as shown in FIG. 5, the retracted position of the abutment 130 and the lateral restraint 160 reduces the overall height of the restraint device 100, thus enabling the restraint device 100 to fit within the safe space 576.

The lateral restraint 160 may also be positioned to minimize damage to the tire 272. The lateral restraint 160 generally includes an arm 162 and a paddle shaped member 164. The distal end 174 of the arm 162 is attached to the abutment 130 in a hinged manner by a rod 168. The proximate end 172 of the arm 160 is slidably attached to a T-shaped protrusion 118 (shown more clearly in FIG. 8) that extends from the side 112 of the base 110. As shown in FIGS. 5A-5D, the lateral restraint 160 of the restraint device 100 extends along the outboard side 273 of the tire 272. The lateral restraint 160 comes in contact with the tire 272. However, this contact occurs at approximately the intersection of the tire tread and the tire wall. Thus, the lateral restraint 160 will cause minimal or no damage to the tire 272.

Figure 5A:
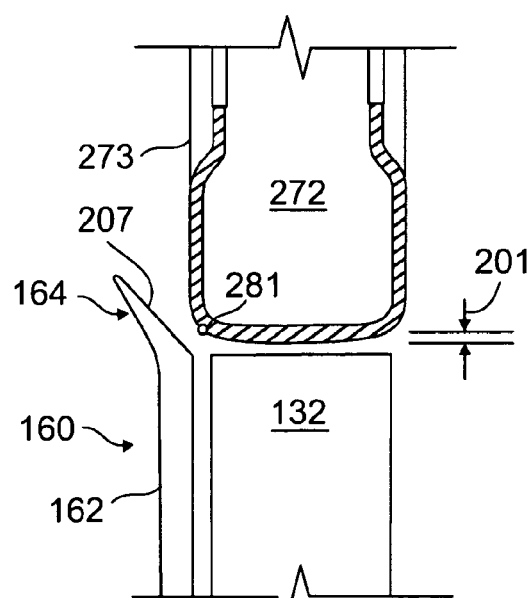
FIG. 5A is a partially segmented section view of a first positional relationship between a tire and the abutment and lateral restraint of FIG. 1.
Figure 5B:
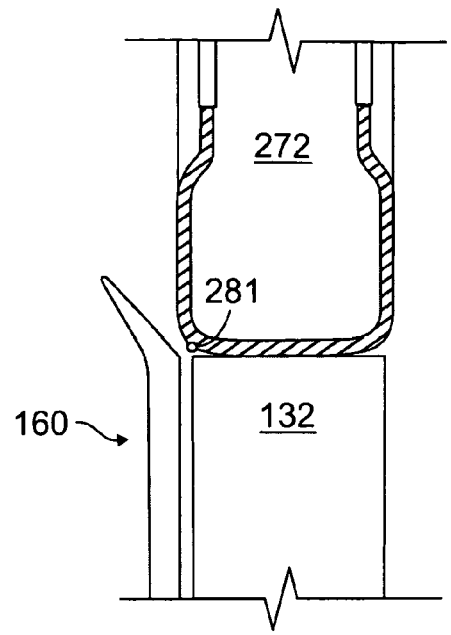
FIG. 5B is a partially segmented section view of a second positional relationship between a tire and the abutment and lateral restraint of FIG. 1.
Figure 5C:
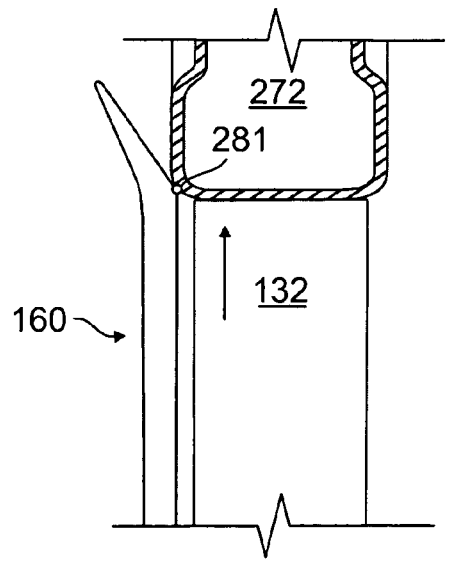
FIG. 5C is a partially segmented section view of a third positional relationship between a tire and the abutment and lateral restraint of FIG. 1.
Figure 5D:
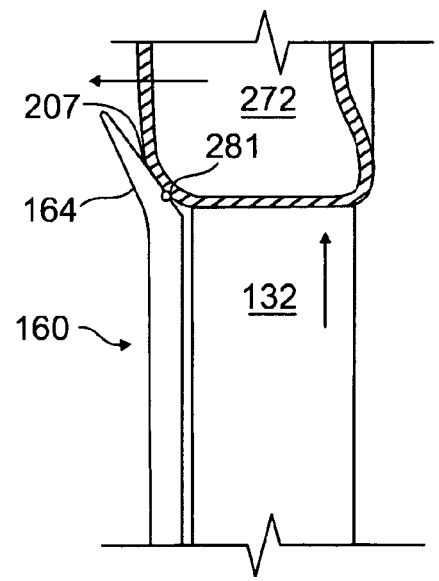
FIG. 5D is a partially segmented section view of a fourth positional relationship between a tire and the abutment and lateral restraint of FIG. 1.

As shown in FIG. 5A, when the device is first attached to the grating, the tire 272 is positioned so as not be in contact with the abutment front face 132 or the lateral restraint 160. The tire 272 is not under compression and therefore has a bulge 201. In FIG. 5B, the abutment front face 132 is brought into contact with the tire 272 but does not exert a strong force on the tire 272. In this position, the lateral restraint 160 is in close proximity to and may contact the tire 272. In FIG. 5C, a force is applied to the tire 272 by the abutment front face 132 that is strong enough to reduce or eliminate the bulge 201. The lateral restraint 160 is in contact with the tire 272. In FIG. 5D, the same force is applied to the tire 272 as was in FIG. 5C. However, in addition, when the vehicle is subject to lateral shifting, the tire 272 shifts laterally towards the lateral restraint 160. In this position, the tire 272 does come into contact with the angled forward facing side 207 of the paddle 164 of the lateral restraint 160. However, with regard to the tire 272, this contact is confined to approximately the contact area 281.

Figure 6:
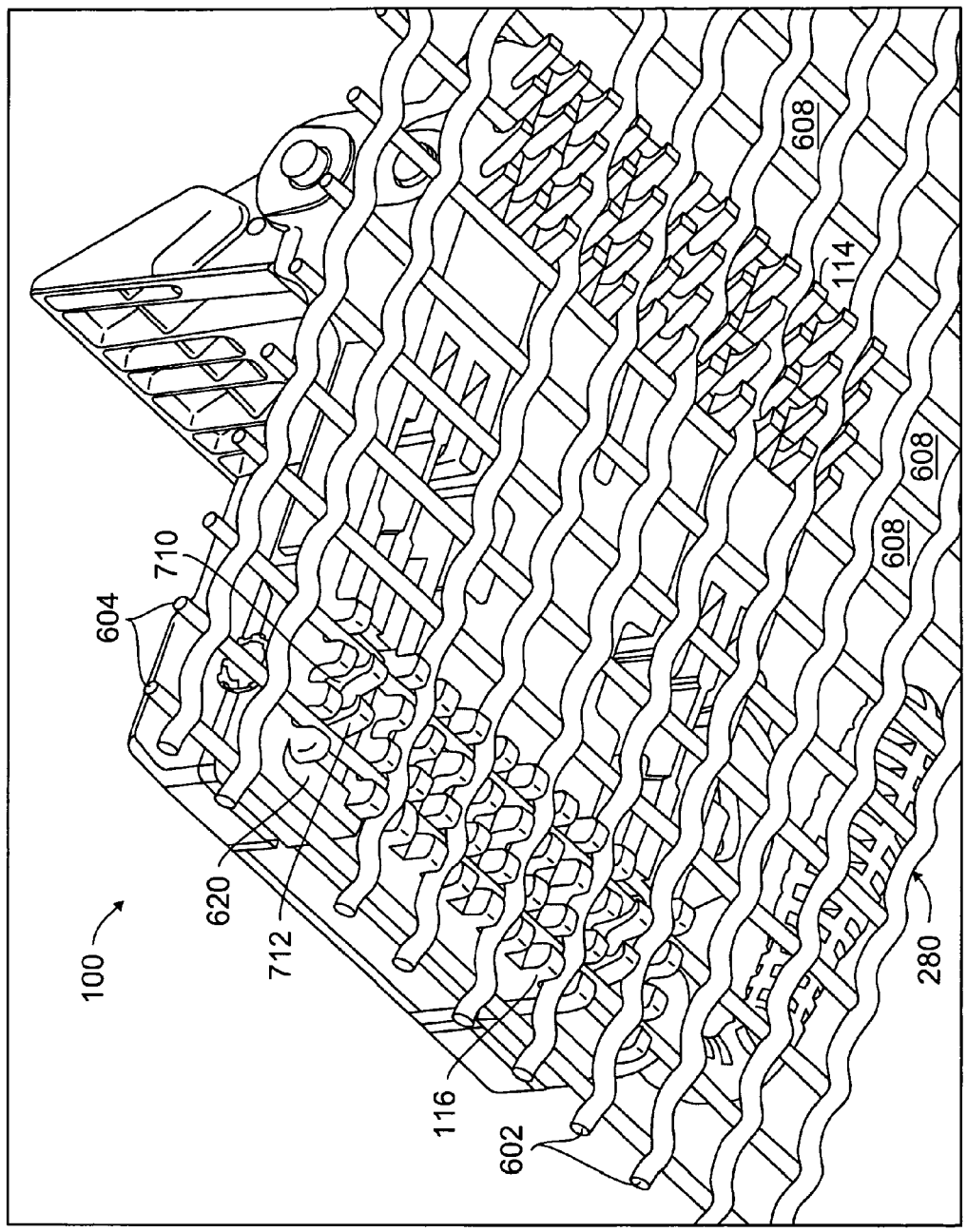
FIG. 6 is a bottom rear-right isometric view of a restraint device connected with a grating.

FIG. 6 illustrates the manner in which the restraint device 100 may be secured to the grating 280. As shown in FIG. 6, the grating 280 includes longitudinal wires or rods 602 upon which lateral wires or rods 604 are secured. Adjacent longitudinal wires 602 along with adjacent lateral wires 604 define apertures 608 therebetween. The restraint device 100 is secured to the grating 280 by a set of angled front protrusions 114 and a set of rear protrusions 116. The base includes one or more spaces 620 through which a portion 710 of the activation system 150 protrudes. This portion 710 includes one or more hooks 712 that also engage the lateral wires 602 of the grating 280.

Both sets of protrusions 114 and 116 in the base 110 are separated from each other so that at least some of the protrusions 114 and 116 engage the lateral wires 604 of the grating 280. For example, the restraint device 100 may be configured to engage a grating 280 for which the space between the lateral rods 604 is 1.5 inches. By including multiple front angled protrusions 114 along at least a longitudinal side of the restraint device 100 and separating them by 0.75 inch, at least one of the front angled protrusions 114 will engage one of the lateral wires 604 of the grating 280. Thus, the restraint device 100 is adjustable by 0.75 inch. A similar spacing may be applied to the rear protrusions 116.

Figure 7:
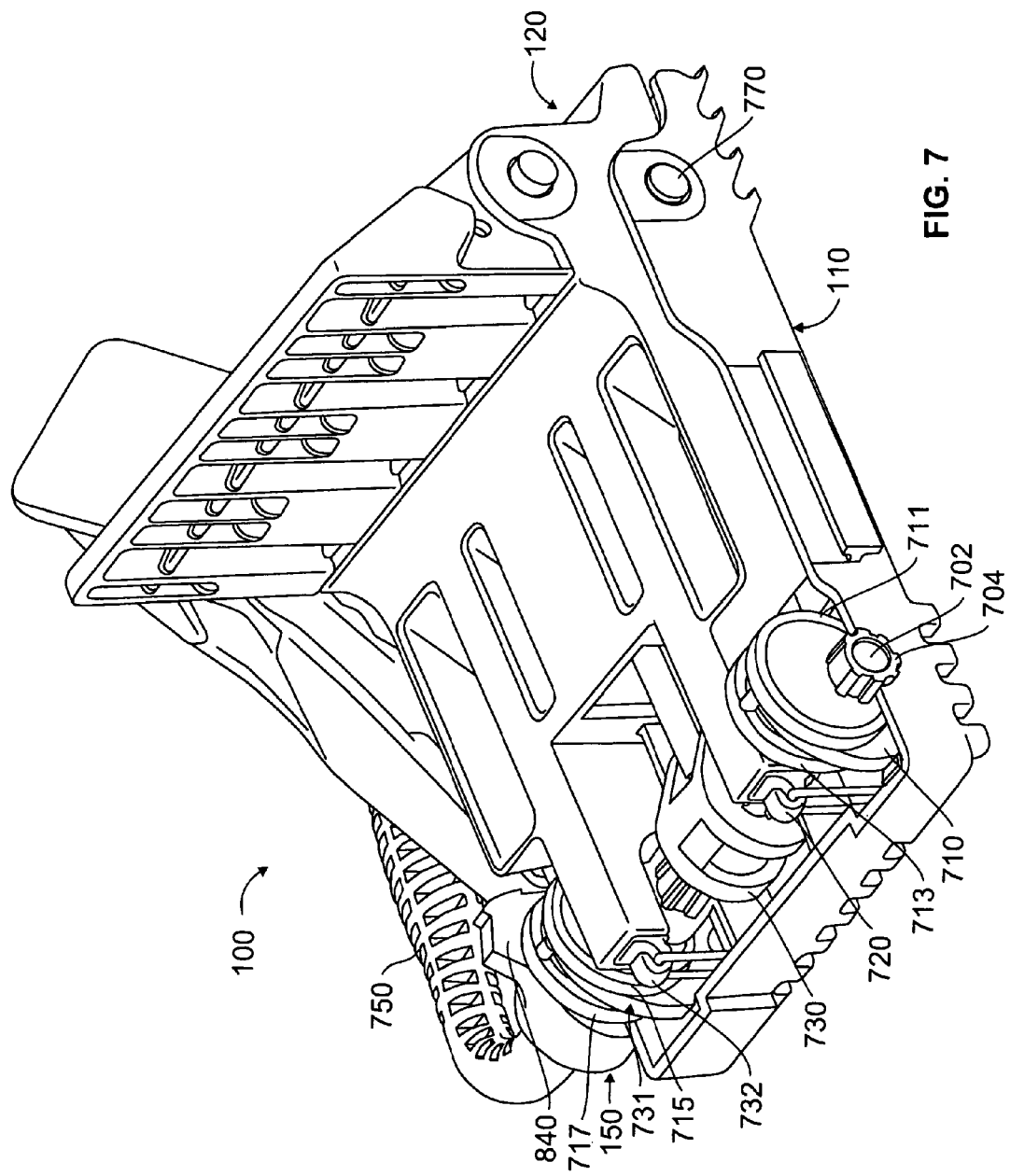
FIG. 7 is a top-rear isometric view of the restraint device of FIG. 1 with a cover removed.
Figure 8:
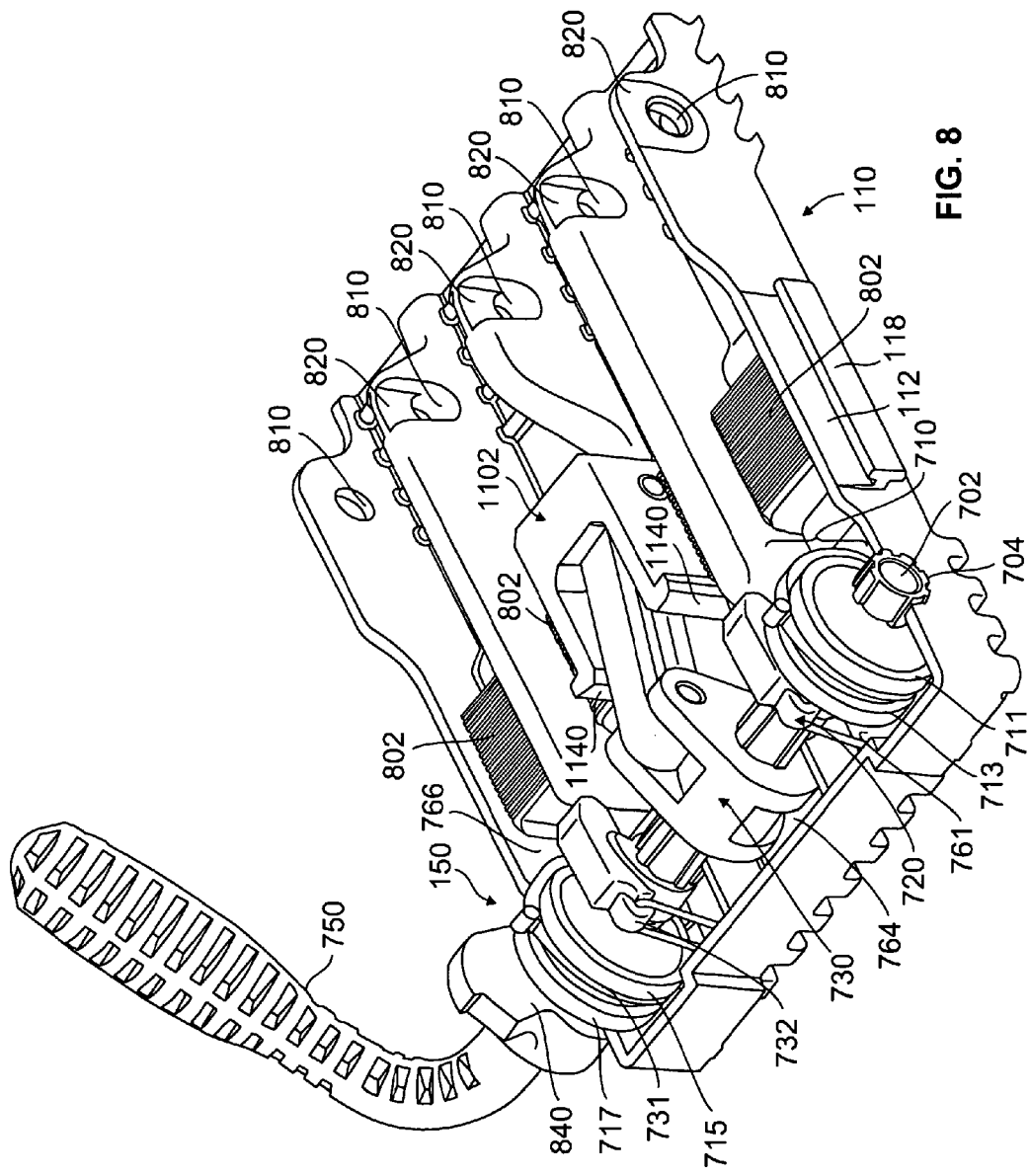
FIG. 8 is a top rear-right isometric view of a base and activation system of the restraint device of FIG. 1.
Figure 9:
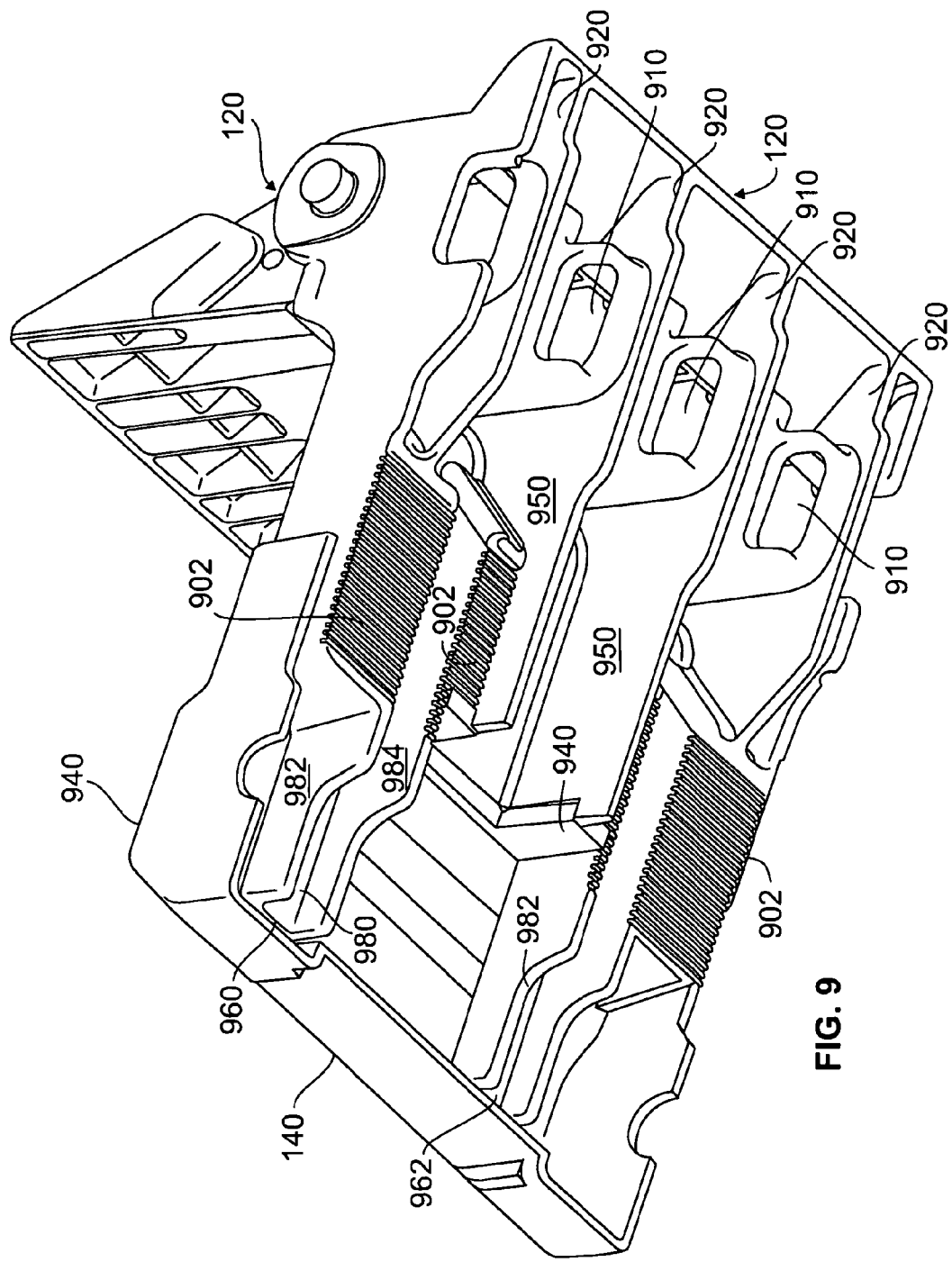
FIG. 9 is a bottom rear isometric view of the support, cover and abutment of the restraint device of FIG. 1.

The activation system 150, its relationship with the base 110, the support 120 and the cover 140 are shown in FIG. 7-9, with FIG. 8 showing a different orientation of the activation system 170 than that of FIG. 7. The activation system 150 includes an operating shaft 702, a latch system 710, a lifter system 720, a longitudinal movement system 730, one or more release wheels 711, 713, 715 and 717, a kick plate 840 and a lever 750. The activation system 150 may also include a second lifter system 732 and a second latch system 731. The lever 750 rotates the operating shaft 702 to operate the activation system 150. As shown throughout, the rotational device is a lever 750. However, the rotational device may include a knob, crank or other such device. Further, although the restraint device 100 is shown as including multiple release wheels 711, 713, 715 and 717 and a kick plate 840, various combinations and/or numbers of these elements may also be used.

At least portions of the latch systems 710 and 731, lifter systems 720 and 732, release wheels 711, 713, 715 and 717, longitudinal movement system 730 and kick plate 840 are in rotational engagement with the operating shaft 702, attached thereto by, for example, by ribs 704 in the operating shaft 702 that mate with corresponding slots in the respective engaging elements. The latch system 710 and release wheels 711 and 713 fit within the pocket 761 defined in the base 110. Similarly, the latch system 731 and release wheels 715 and 717 fit within pocket 766. The longitudinal movement system 730 fits within pocket 764. The lifter systems 720 and 732 fit within pockets 960 and 962, respectively, which are primarily defined in the support 120. All these systems, except the kick plate 840, are covered by the cover 140.

The base 110 and the support 120 are connected together by a rod 770. The base includes a series of apertures 810 in partitions 820 that help define the pockets 761, 960, 764, 962 and 766. The support 120 includes a series of slots 910 in the partitions 920 that provide further definition of the pockets 761, 960, 764, 962 and 766. When the support 120 is placed on top of the base 110, the walls 920 of the support 120 align with the walls 820 of the base 110 so that the apertures 810 in the base 120 are in approximately horizontal alignment with the slots 910 in the support 120. The rod 770 is inserted through the apertures 810 in the base 110 and the slots 910 in the support 120. The rod 770 is secured within the apertures 810 of the base 110, but are not secured to the slots 910 in the support 120 so that the support 120 may move longitudinally with respect to the base 110. The base 110 and the support 120 are further connected to each other by one or more sets of teeth 802 and 902. The teeth 802 in the base 110 are rearwardly facing and may be located in pockets 761, 764 and 766. These teeth 802 mate with corresponding forwardly facing teeth 902 in the support 120. This arrangement of teeth 802 and 902 permit forward motion of the support 120 with respect to the base 110.

Figure 10:
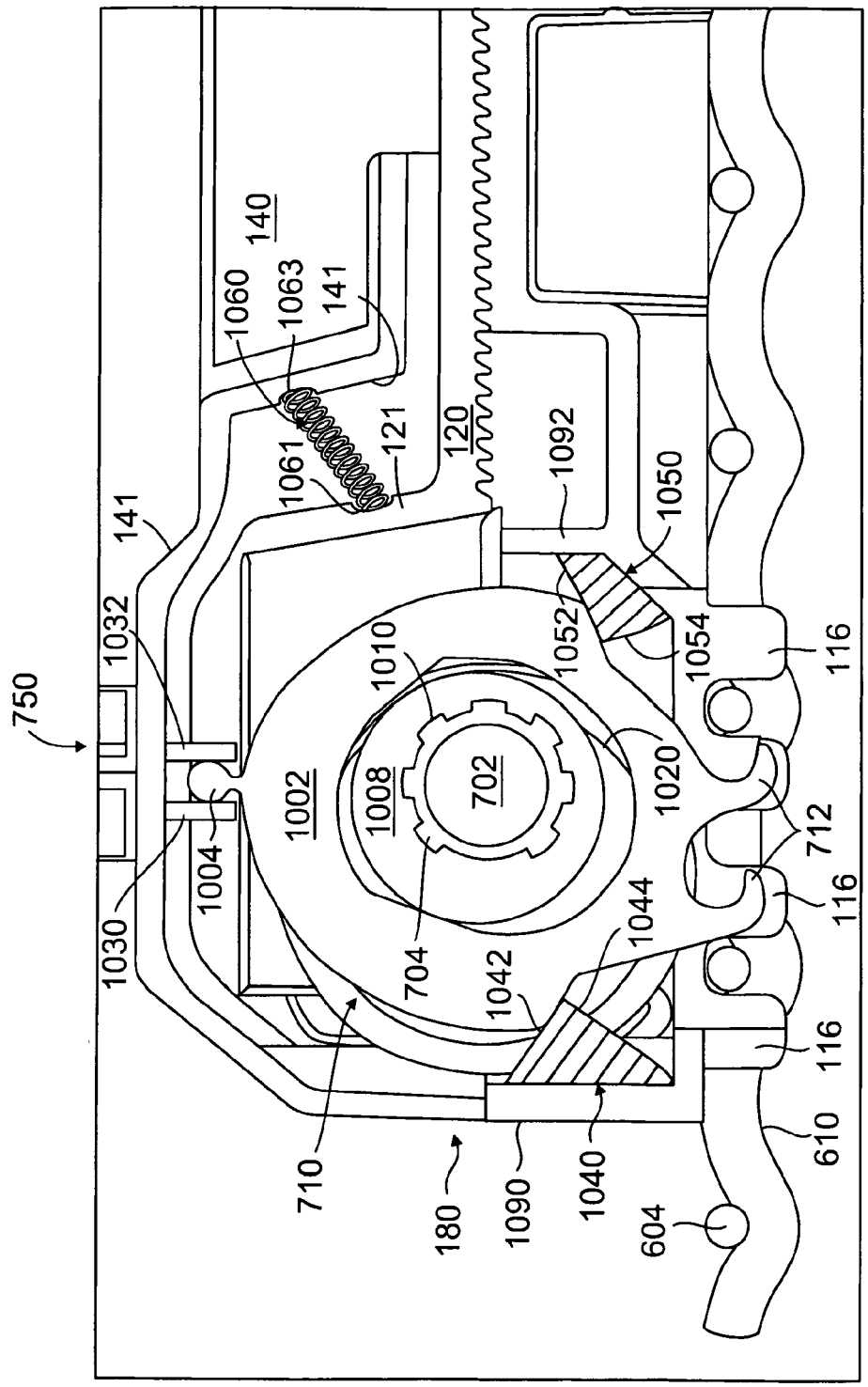
FIG. 10 is a cross-sectional view of the base and latch system of the restraint device of FIG. 1.

A more detailed view of the latch system 710 is shown in FIG. 10. The latch system 710 includes a latching mechanism 1002 and a latching cam 1008. The latching mechanism 1002 includes an irregularly shaped orifice 1020, a crown ball 1004 and two or more hooks 712. The latching cam 1008 surrounds the operating shaft 702 and is connected therewith by one or more slots 1010 that mate with the ribs 704 of the operating shaft 702. The latching mechanism 1002 is movably attached to the cover 140 via lugs 1030 and 1032 so that it is movably suspended about the latching cam 1008 by seating surfaces 1042 and 1052. Due to the interaction of the latching cam 1008 with the irregularly shaped orifice 1020, the latching mechanism 1002 will rotate about the crown ball 1004 so that the hooks 712 move towards the front (not shown) or the rear 180 of the restraint device 100 depending on the direction of rotation of the operating shaft 702. As shown in FIG. 10, if the operating shaft 702 is rotated clockwise, the latching mechanism 1002 will rotate towards the front of the restraint device 100 and at least one of the hooks 712 will engage at least one of the lateral wires 604 of the grating 280. In contrast, if the operating shaft 702 is rotated counter-clockwise, the latching mechanism 1002 will rotate towards the rear 180 of the restraint device 100 and the hooks 712 will disengage and/or move away from the lateral wires 604 of the grating 280.

Figure 11:
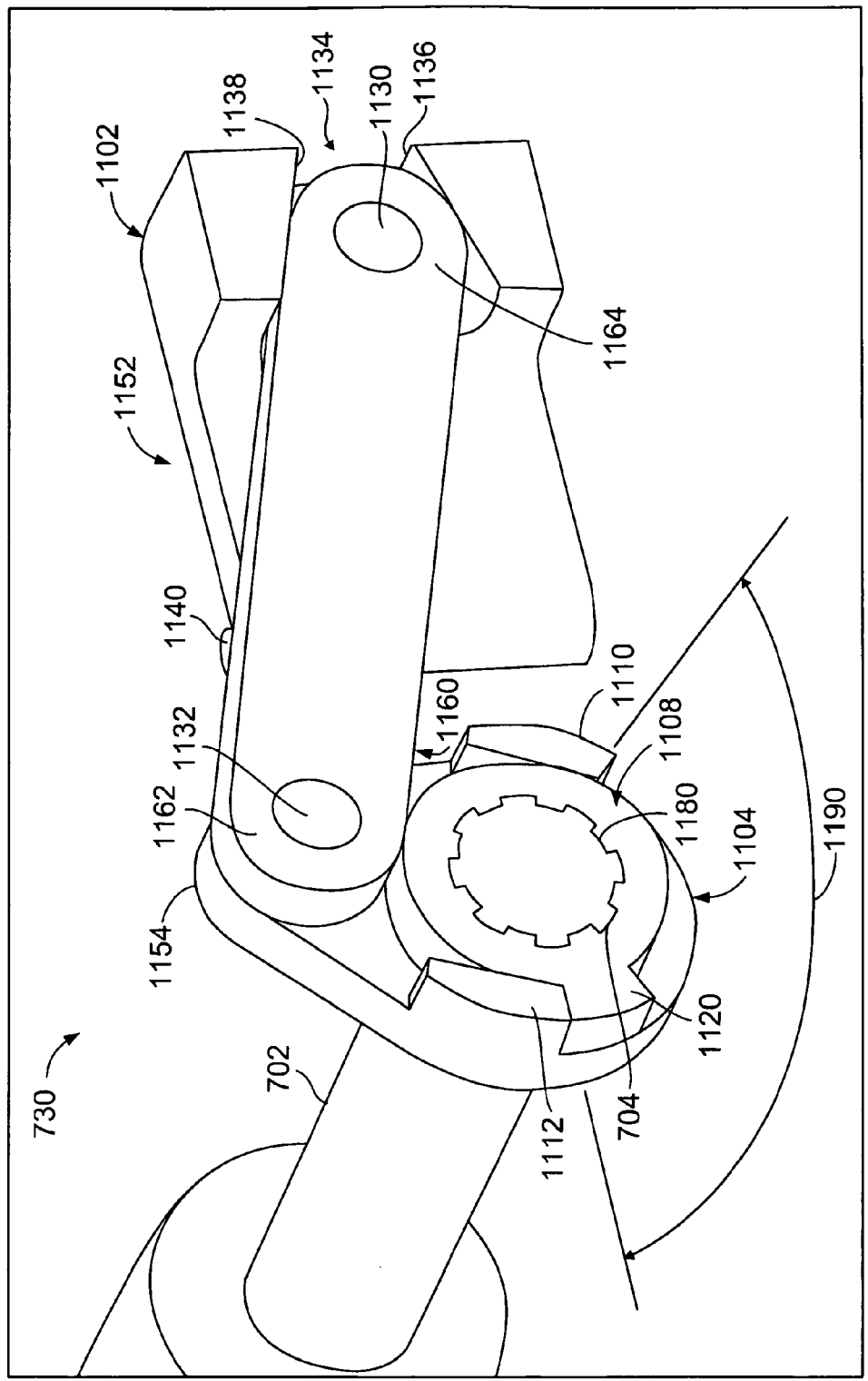
FIG. 11 is a partial isometric cross-sectional view of a longitudinal movement system of the restraint device of FIG. 1.

A detailed sectional view of the longitudinal movement system 730 is shown in FIG. 11. The longitudinal movement system 730 moves the support 120 horizontally with respect to the base 110 to bring the abutment 130 into engagement with the tire 272. The longitudinal movement system 730, shown in cross section, generally includes a jaw spring 1102, a push rod 1160, a crank 1104, and a rotator stud 1108.

The rotator stud 1108 surrounds the operating shaft 702 and is connected therewith by one or more slots 1180 that mate with the ribs 704 of the operating shaft 702. The crank 1104 includes a pair of protrusions 1110 and 1112 that define a slot 1190 therebetween. The rotator stud 1108 includes a rotational tab 1120 that is movable within the slot 1190. The crank 1104 is connected to the jaw spring 1102 via push rod 1160. The push rod 1160 is connected at its first end 1162 to the narrow end 1154 of the crank 1104 by a rod or pin 1132. The push rod 1160 is connected at its second end 1164 to an opening 1134 in the jaw spring 1102. The opening 1134 may be defined by walls 1136 and 1138. As shown in FIG. 8 and FIG. 9, the jaw spring 1102 is confined to longitudinal movement in the pocket 764 by walls 950 in the support 120.

Referring to FIG. 11, as the operating shaft 702 is rotated clockwise, the rotational tab 1120 pushes on the protrusion 1112, thus causing the crank 1104 and the first end 1162 of the push rod 1160 to rotate. Because, as shown in FIG. 8 and FIG. 9, the jaw spring 1102 is confined to longitudinal movement, the push rod 1160 moves the jaw spring 1102 away from the crank 1104. In contrast, when the operating shaft 702 is rotated in a counter-clockwise direction, the crank 1104 will not rotate until and the rotational tab 1120 traverses the slot 1190 and engages the protrusion 1110. Once the rotational tab 1120 is engaged to the protrusion 1110, the crank 1104 and the push rod 1160 will rotate in a counter-clockwise direction. Thus, the jaw spring 1102 will move towards the crank 1104. In order to accommodate the movement of the second end 1164 of the push rod 1160, the walls 1136 and 1138 of the jaw spring 1102 may be angled.

The jaw spring 1102 includes a pair of lips 1140 (see FIG. 8) that, when engaged with the lateral walls 940 of the support 120 (see FIG. 9), the support is pulled forward to engage the abutment 130 with the tire 272. When the lever 750 is in the rear position, the jaw spring 1102 is positioned within the pocket 764 of the base 110 so that the lips 1140 engage lateral walls 940. In contrast, as the lever 750 is moved into the forward position, the jaw spring 1102 is urged forward moving the support 120, and thus the abutment 130, forward due to the force of the lips 1140 on the lateral walls 940. As pressure continues to be placed on the lever 750 after the abutment 130 has engaged the tire 272, the continuing force will compress the lips 1140 inward forcing them between walls 950, thereby releasing the force thrusting the abutment 130 into the tire 272. Thus, even when the restraint device 100 is initially placed very close to the tire 272, the remainder of the activation system 150 completes the engagement cycle even after the abutment 130 has engaged the tire 272.

Referring to FIG. 10, the longitudinal movement system 730 may further include a rearward bias member 1060. For example, as shown in FIG. 10, the rearward bias member 1060 may include a compression spring seated on the support 120 and the cover 140. For example, as shown in FIG. 10, the first end 1061 of the rearward bias member 1060 is attached to a wall 121 in the support 120 and the second end 1063 is seated on the bottom surface 141 of the cover 140. The rearward bias member 1060 is generally seated at an angle such that the second end 1063 is positioned forward and upward of the first end 1061. Thus, when the lifter system 720 is lifting the support 120 during disengagement, the rearward bias member 1060 applies pressure to the support 120, pushing it towards the rear 180 of the restraint device 100. In addition, when the support 120 is not lifted and the teeth 902 of the support 120 are engaged with the teeth 802 of the base 110, the downward pressure on the support 120 from the rearward bias member 1060 reinforces the engagement. In addition to that shown in FIG. 10, the rearward bias member 1060 may be attached to the cover 140 and the support 120 at various other locations. In an alternative embodiment, the rearward bias member 1060 may be seated on the support 120 and the base 110, such that the bias member 1060 is angled so that its second end 1063 is seated on the support 120 in front of and upward from the first end 1061, which is seated on the base 110.

Figure 15:
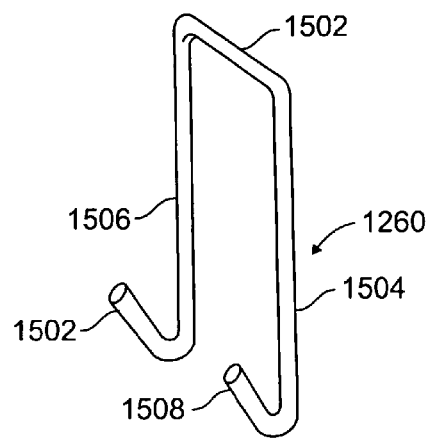
FIG. 15 is an isometric view of a spring of the lifter system of FIG. 12.
Figure 16:
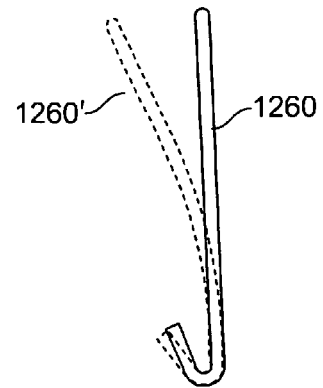
FIG. 16 is a side view of the spring of FIG. 15.

A more detailed cross-sectional view of the lifter system 720 is shown in FIGS. 12-16. Because the support 120 is engaged to the base 110 by rearwardly facing teeth 802, the support 120 must be lifted above the teeth 802 in the base 110 so that the support 120 and thus the abutment 130 can be disengaged from the tire 272. The lifter system 720 generally includes a pawl 1202, a spring 1260 and a cam 1240. The cam 1240 includes one or more protrusions 1402 and is engaged with the operating shaft 702, for example via slots 1242 that mate with corresponding ribs 704 on the operating shaft 702. The pawl 1202 is located in pocket 960 (see FIG. 9) between walls 982 and 984. The top surface 1322 of the pawl is adjacent the lower surface 980 of the pocket 960. In addition to the top surface 1322, the pawl 1202 includes one or more indentations 1302, a longitudinal movement edge 1306, a transition edge 1324 and a hook 1320. As shown in FIG. 15, the spring 1260 includes a top portion 1502, two sides 1504, 1506 and two upward bends 1508, 1510, respectively. In its free shape the spring 1260' is configured as shown by the dotted line in FIG. 16. As shown in FIG. 12, the top portion 1502 of the spring 1260 is connected to the pawl 1202 by the hook 1320. The bends 1508 and 1510 of the spring 1260 are secured within a spring seat 1450 in the base 110 of the restraint device 100.

Figure 25:
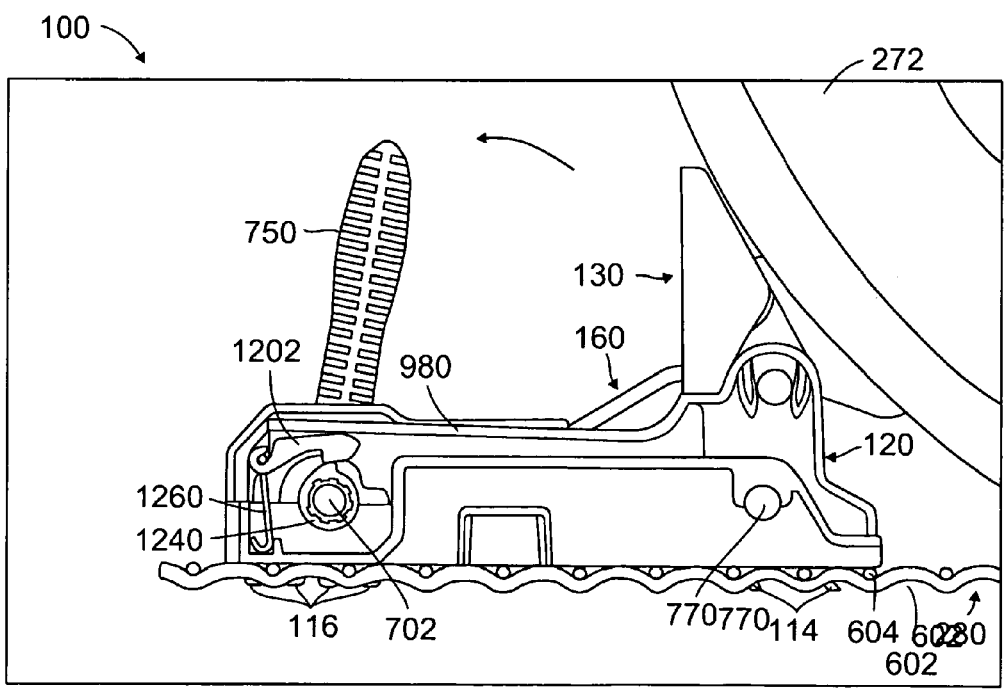
FIG. 25 is a right cross-sectional view of the restraint device of FIG. 1 in a first disengaging position showing the lifter system.

The pawl 1202 is configured to raise the support 120 when the restraint device 100 is being disengaged from the grating 280. In other words, the top surface 1322 of the pawl engages and lifts the upper surface 980 of the support 120 when the lever 750 is moving into the rear position. As shown in FIGS. 12 and 25, as the lever 750 is being moved into the rear position, it turns the operating shaft 720, and thus the cam 1241 and the protrusions 1402 in a counter-clockwise direction. The protrusions 1402 lift the cam 1202 until the protrusions 1402 are rotated just past the transition edge 1324 of the pawl 1202. At this point, the pawl 1202 drops so that the protrusions 1402 extend into the indentations 1302.

In contrast, if the restraint device 100 is to be engaged with the grating 280 and the tire 272, the cam will initially be oriented so that the protrusions 1402 are located to the left of the longitudinal movement wall 1306 of the pawl 1202. As the lever 750 is being moved into the forward position to engage the restraint device 100, it turns the operating shaft 702, and thus the cam 1240 and the protrusions 1402 in a clockwise direction. The protrusions 1402 engage the longitudinal movement wall 1306 of the pawl 1202 and push it forward. As the pawl 1202 is pushed forward, the spring 1260 is extended. When the protrusion 1402 rotates and bypasses the transition edge 1324, releasing its contact with the pawl, the pawl is pulled back into its original position (as shown in FIG. 12) by the spring 1260.

Figure 17:
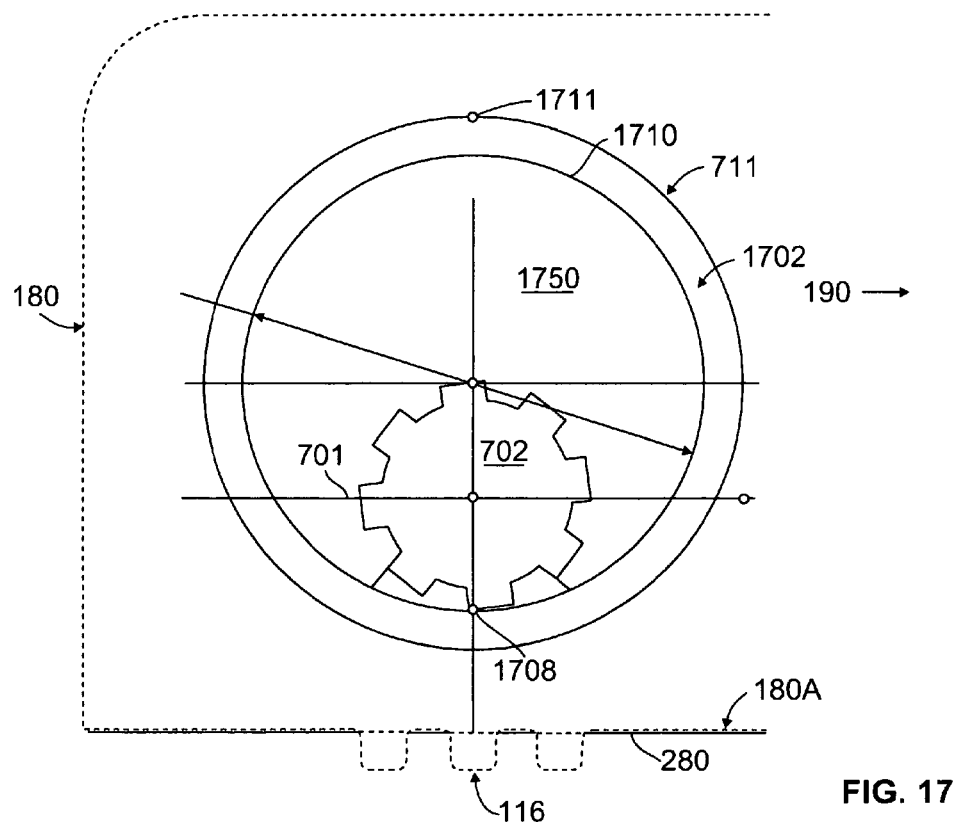
FIG. 17 is a cross-sectional view of a release wheel of FIG. 1 in a first position.
Figure 18:
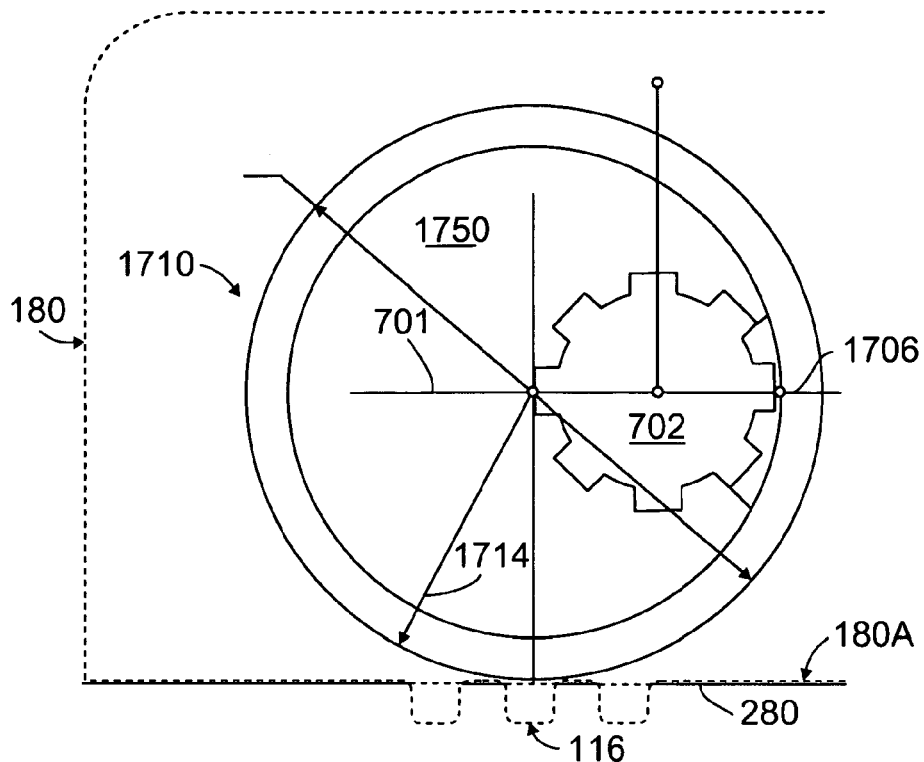
FIG. 18 is a cross-sectional view of the release wheel of FIG. 17 in a second position.
Figure 19:
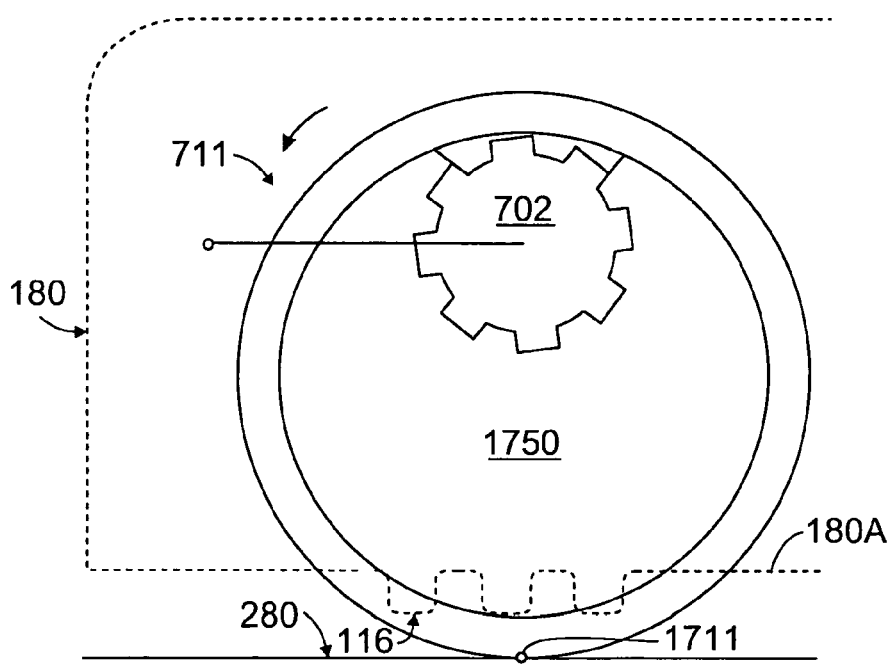
FIG. 19 is a cross-sectional view of the release wheel of FIG. 17 in a third position.
Figure 26:
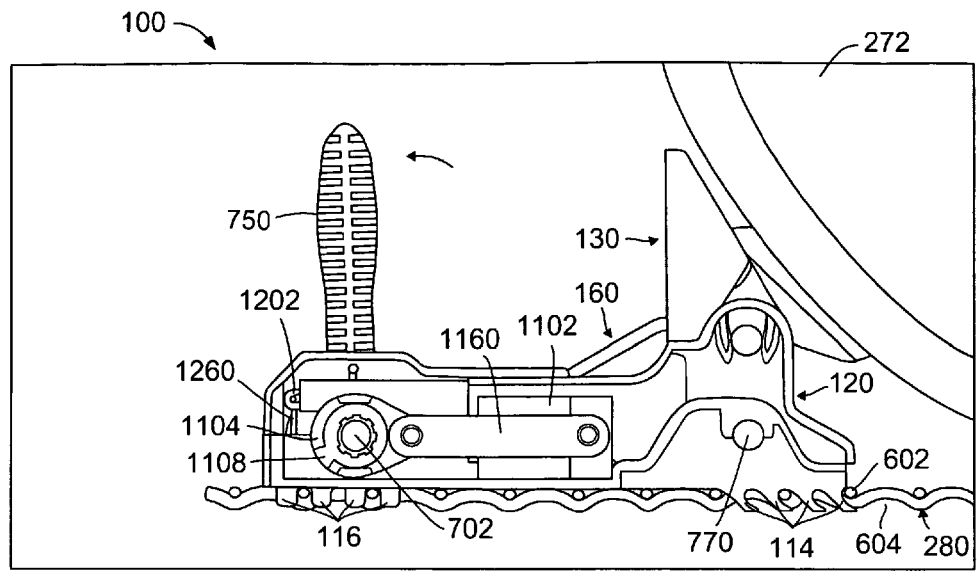
FIG. 26 is a right cross-sectional view of the restraint device of FIG. 1 in a second disengaging position showing the longitudinal movement system.

The release wheel 711 is shown in various stages of operation in FIGS. 17-19. The description that follows is equally applicable to the other release wheels 713, 715 and 717. The release wheel 711 includes a circular cam 1750 attached to shaft 702, with an outer ring. The cam 1750 and ring 1702 are offset from the centerline 701 of the operating shaft 702. The cam 1750 is attached to the operating shaft 702 so that it rotates with the operating shaft 702. The outer surface 1710 of the cam 1750 is smooth, allowing it to rotate within the ring 1702, which has a smooth inner surface, about the operating shaft 702 as the operating shaft 702 is rotated by the lever (not shown). As the operating shaft 702 rotates counterclockwise when the lever 750 is moved from an approximately horizontal position facing the front 190 of the restraint device 100 to an approximately vertical position (as shown in FIG. 26), the ring 1702 and cam 1750 rotate in a counter-clockwise direction with the operating shaft 702 to the position shown in FIG. 18. In FIG. 18, the ring 1702 of the cam 1750 is in contact with the grating 280. When the operating shaft 702 is further rotated counterclockwise when the operator moves the lever 750 to an approximately horizontal position facing the rear 180 of the restraint device 100 (as shown in FIG. 29), the surface of the ring 1702 frictionally engages the grating 280 and ceases or reduces its rotation. The cam 1750 continues to rotate with the operating lever 703, forcing the shaft 702 upward and away from the grating 280, thus lifting the bottom of the rear end 180A of the restraint device away from grating 280, the position shown in FIG. 19.

As shown in FIG. 17, when the restraint device 100 is positioned so that the lever 750 is horizontal with respect to the grating 280 and pointing towards the front 190 of the restraint device 100, the distal point 1711 of the release wheel 711 is above and in vertical alignment with the center of the operating shaft 702. The center of the operating shaft is still located a distance above the grating 280. The bottom of the rear end 180A rests on the grating 280, with protrusions 116 extending below the grating. In FIG. 18, when the restraint device is positioned so that the lever points upward, the distal point 1711 of the release wheel is in horizontal alignment with the center of the operating shaft 702, and the ring 1102 is now in contact with the grating 280. The bottom of the rear end 180A still rests on the grating 280, with protrusions 116 extending below the grating.

As shown in FIG. 19, when the restraint device 100 is positioned so that the lever 750 is horizontal with respect to the grating 280 and pointing towards the rear 180 of the restraint device 100, the distal point 1711 of the release wheel 711 is below and in vertical alignment with the center of the operating shaft 702. However, because the distance from the center of operating shaft 702 to distal point 1711 is greater than the distance from the center of operating shaft 702 to the bottom of the rear end 180A, the release wheel 711 has lifted the operating shaft 702 and thus, the bottom of the rear end 180A of the restraint device 100 to a distance above the grating 280, as indicated by the dotted line.

FIGS. 20-29 show the restraint device 100 and its various elements in various positions during the operation of the restraint device 100. Throughout FIGS. 20-29, the front surface 132 of the abutment 130 faces the tire 272 and the paddle 164 of the lateral restraint 160 is on the outboard side of the tire 272 in a raised position.

Figure 20:
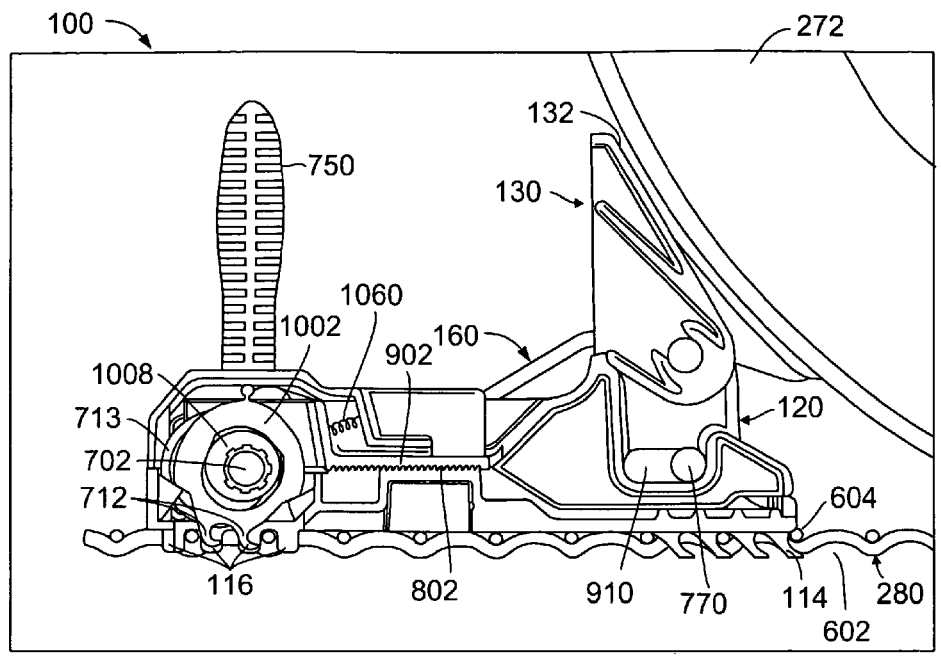
FIG. 20 is a right cross-sectional view of the restraint device of FIG. 1 in an initial position showing a apertured surface latch system.
Figure 21:
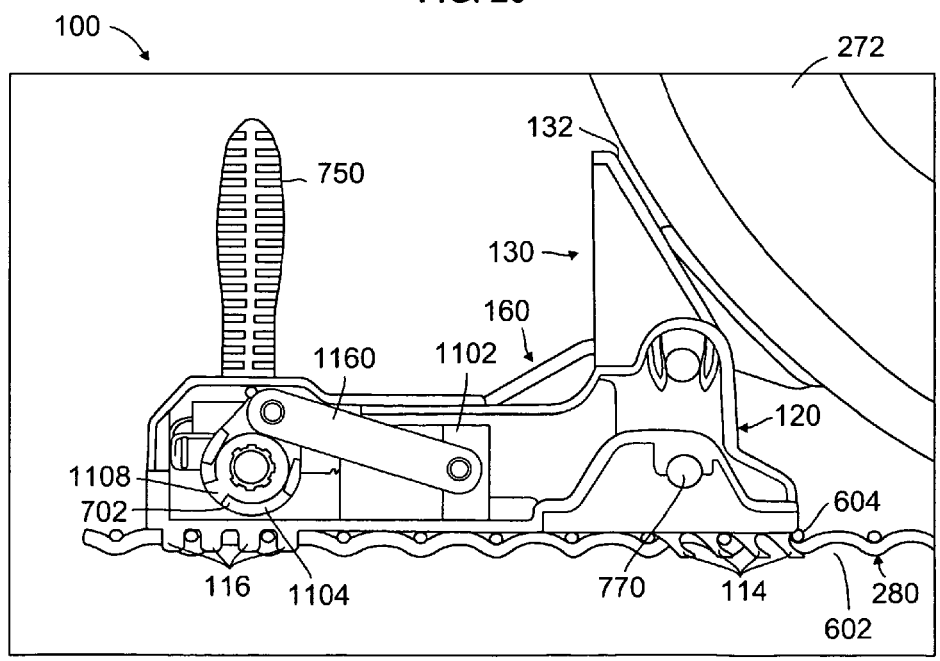
FIG. 21 is a right cross-sectional view of the restraint device of FIG. 1 in an initial position showing a longitudinal movement system.
Figure 22:
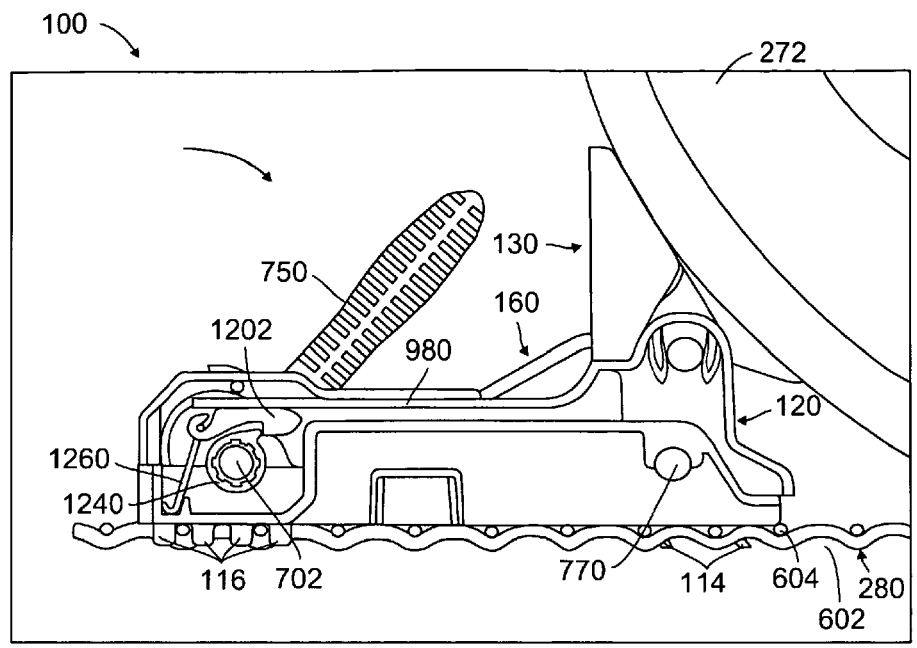
FIG. 22 is a right cross-sectional view of the restraint device of FIG. 1 in an engaging position showing the lifter system.
Figure 23:
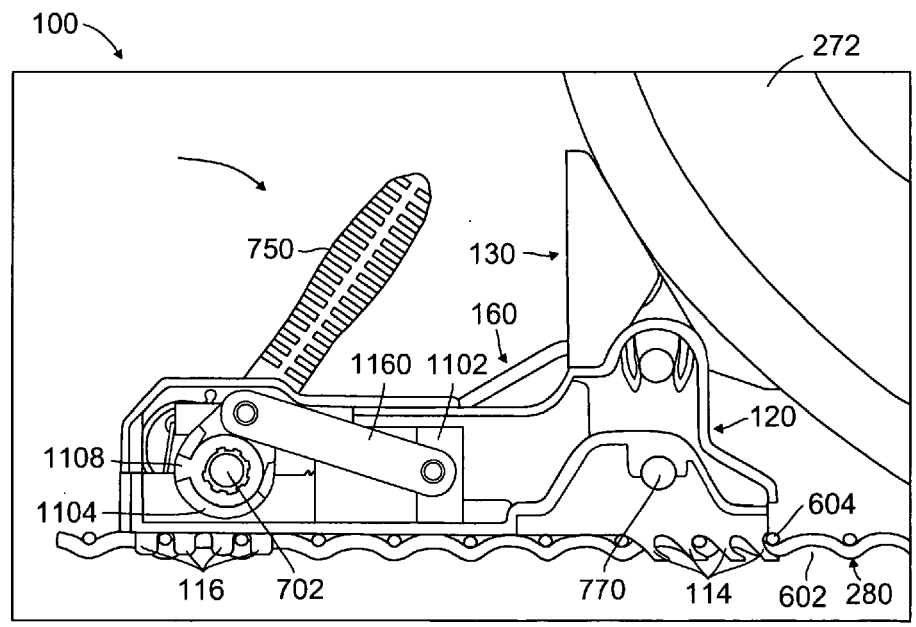
FIG. 23 is a right cross-sectional view of the restraint device of FIG. 1 in an engaging position showing the longitudinal movement system.
Figure 24:
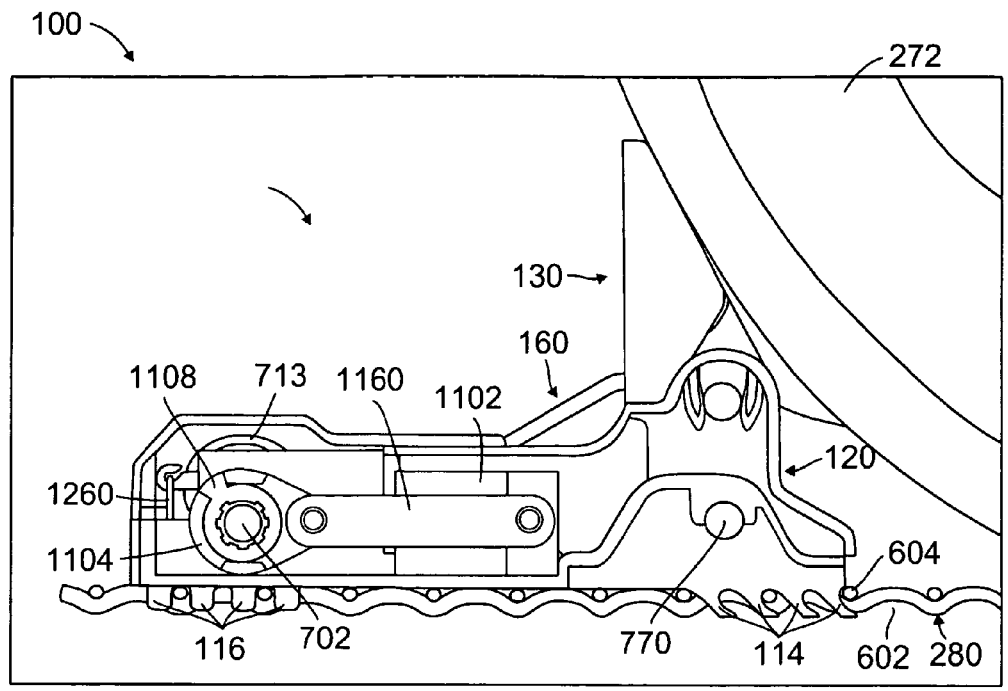
FIG. 24 is a right cross-sectional view of the restraint device of FIG. 1 in an engaged position showing the longitudinal movement system.
Figure 27:
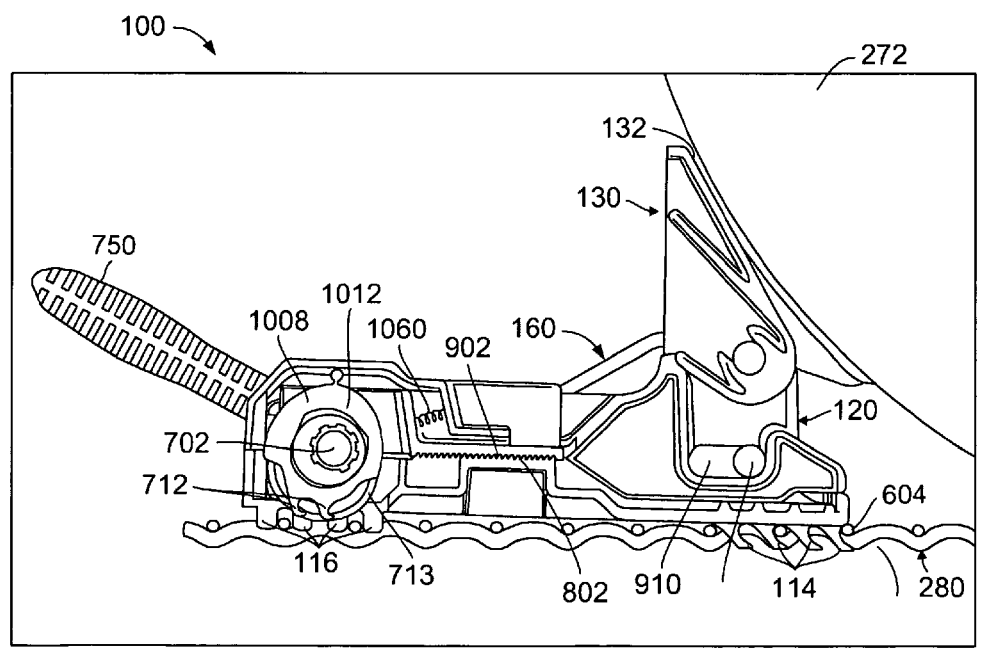
FIG. 27 is a right cross-sectional view of the restraint device of FIG. 1 in a third disengaging position showing the apertured surface latch system.
Figure 28:
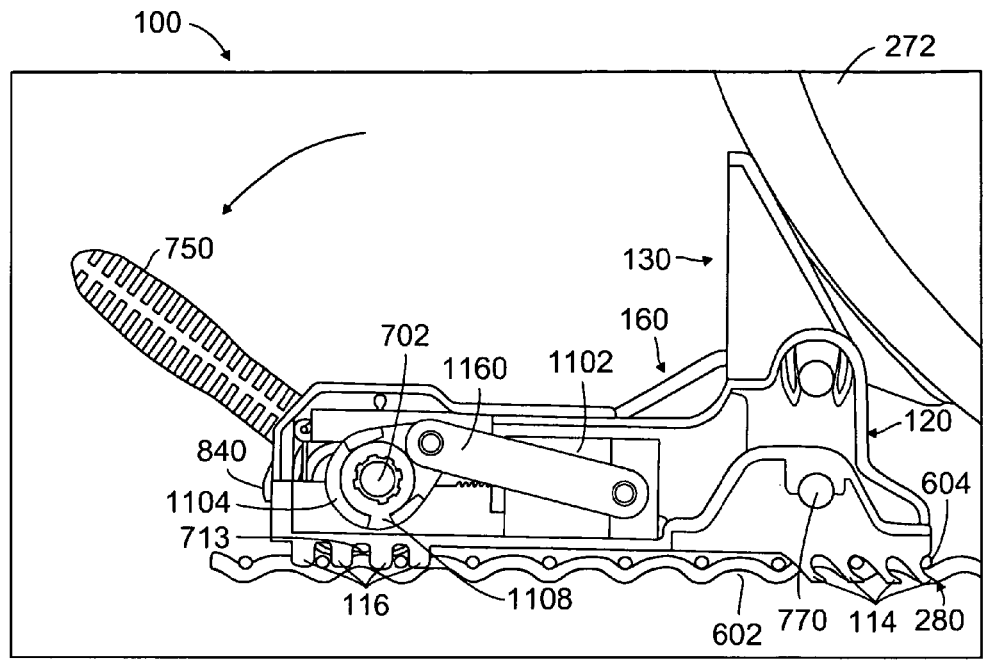
FIG. 28 is a right cross-sectional view of the restraint device of FIG. 1 in a third disengaging position showing the longitudinal movement system.

FIGS. 20 and 21 show the position of the restraint device 100 after it has been placed on the grating 280 (the "initial position"). FIGS. 22 and 23 show one position of the restraint device 100 and its elements during engagement of the restraint device 100 (an "engaging position") having moved there from the positions shown in FIGS. 20 and 21. FIG. 24 shows the position of the restraint device 100 and its elements when the restraint device 100 is engaged to the tire 272 and the grating 280 (the "engaged position") having moved there from the positions shown in FIGS. 22 and 23. FIG. 25 shows one position of the restraint device 100 and its elements during disengagement of the restraint device 100 (a "first disengaging position") having moved there from the positions shown in FIG. 24. FIG. 26 shows another position of the restraint device 100 and its elements during disengagement of the restraint device 100 (a "second disengaging position") having moved there from the positions shown in FIG. 25. FIGS. 27 and 28 show yet another position of the restraint device 100 and its elements during disengagement of the restraint device 100 (a "third disengaging position") having moved there from the positions shown in FIG. 26.

FIG. 29 show the position of the restraint device 100 and its elements when the restraint device 100 is disengaged from the tire 272 and the grating 280 (the "rear disengaged position") having moved there from the positions shown in FIGS. 27 and 28. As shown in FIG. 29, in this position, the kick plate has rotated so that one of its projections 841 or 843, in this instance 843, has engaged a lateral wire of the grating 280 to shift the device away from the tire. Two projections 841 and 843 are necessary to ensure that a lateral wire is engaged, because the clamping teeth and studs are placed at a pitch that is half the pitch of the lateral wires of the grating.

Figure 30:
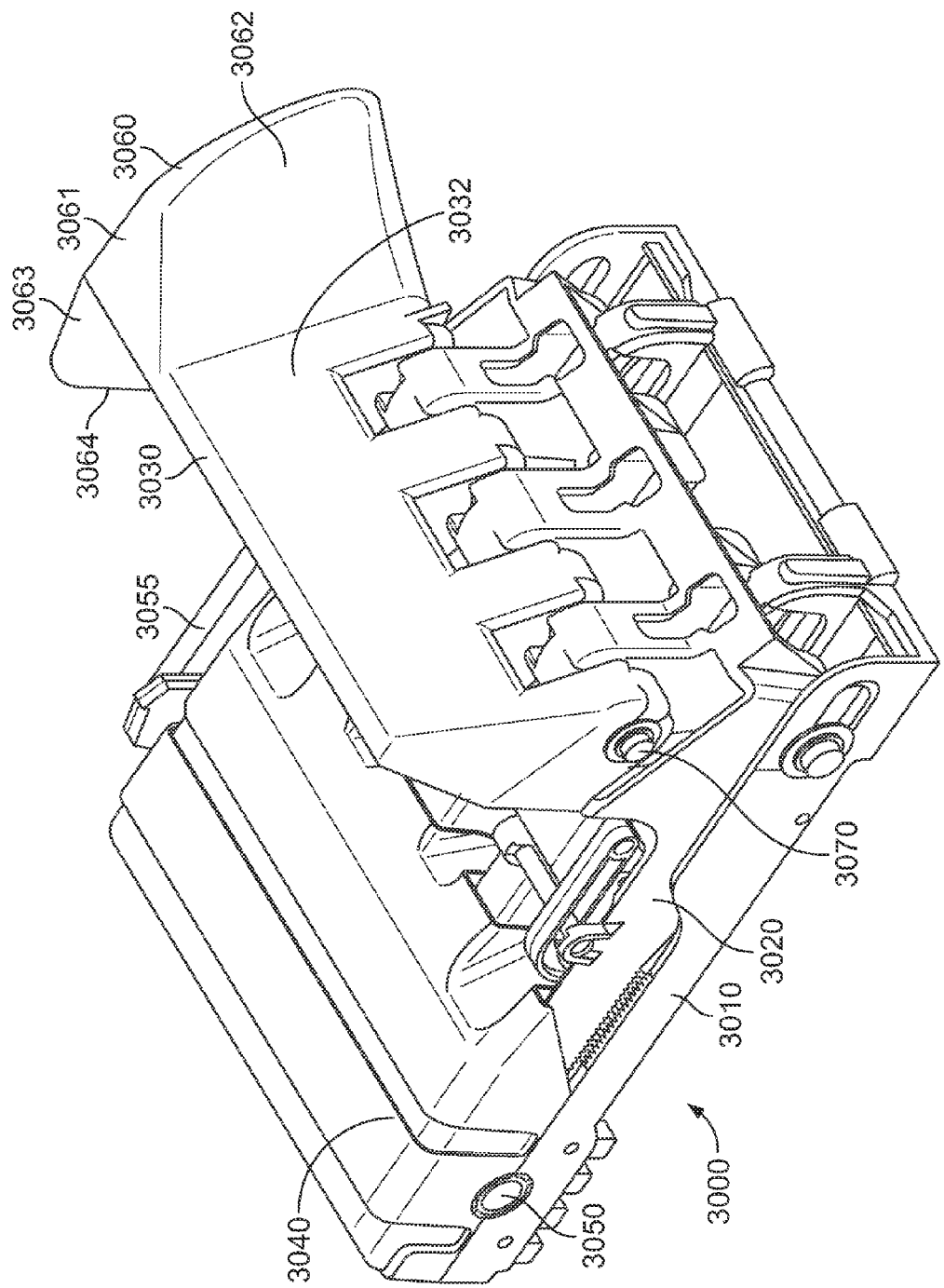
FIG. 30 is an upper right side view of a restraint device with the abutment in an extended position.

FIG. 30 shows an alternate embodiment of the present invention, similar to the first embodiment described in FIGS. 1-29, with the exceptions concerning the lateral restraint and additional features described below. FIG. 30 shows a restraint device 3000 includes a base 3010, a support 3020, an abutment 3030 and an activation system 3050. The restraint device 3000 may further include a lateral restraint 3060 and a cover 3040. The base 3010, along with the activation system 3050, secures the restraint device 3000 to an apertured surface. The abutment 3030, which is placed adjacent the outer edge of the tire, acts as a barrier to the tire, thus reducing or preventing movement of the tire in the direction of the restraint device 3000. The abutment 3030 and the support may be moved relative to the base 3010 by the activation system 3050. The abutment 3030 is in a hinged relationship with the support 3020 and can rotate forward about rod 3070. To engage and disengage the restraint device 3000 from an apertured surface and the tire, the activation system 3050 may include a lever 3055.

The lateral restraint 3060 in this embodiment differs from the prior embodiment in the lateral restraint is formed of a wedge 3061 that is attached to one end of abutment 3030. In this case, the wedge 3061 is integrally formed with abutment 3030, but may also be formed as a separate piece that is attached to the abutment 3030. In the embodiment shown, the lateral restraint 3060 is on the left side of the device (where the abutment 3030 is considered to be the front of the device). A right-handed device would have an identical lateral restraint placed on the right side of the abutment 3030. A left-handed device and right-handed device are used in pairs installed against the tread on either side, fore and aft, of the tire to be restrained, with the lateral restraint 3060 of each device 3000 located outboard of the vehicle In FIG. 30, the abutment 3030 is shown in an extended position, with front face 3032 facing forward (toward the tire). The front wedge 3061 is attached at one end of the front face 3032 of abutment 3030. The wedge 3061 has a front wedge face 3062 that is contiguous with front face 3032, breaking at an angle from front face 3032. Preferably, front wedge face 3062 is angled at approximately 45 degrees from the front face 3032, toward the front of the device and toward the tire. In this manner, when the abutment 3030 is engaged with a tire, the front wedge face 3062 contacts the tire only at the intersection of tread and sidewall. This allows the device to be installed in a manner such that the lateral restraint 3060 is disposed on the outer sidewall of a tire without scuffing the sidewall of the tire. However, the wedge face 3062 is in position to restrain the tire from moving sideways past the wedge due to lateral forces during transit. The wedge faces on chocks placed against tires on both sides of the vehicle will therefore restrain the vehicle from moving from side to side due to lateral forces.

Figure 30A:
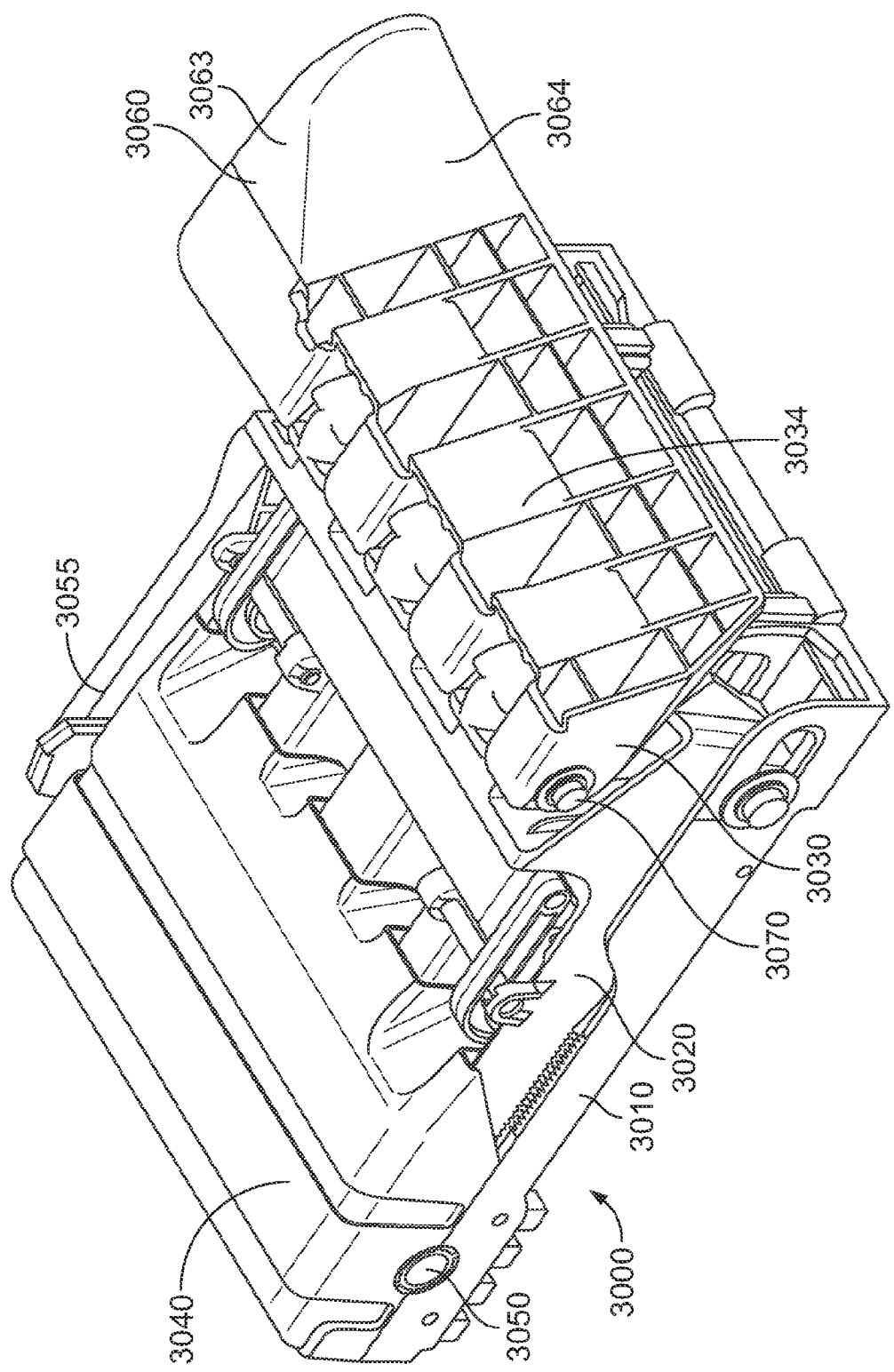
FIG. 30A is an upper right side view of the restraint device of FIG. 30 with the abutment in a retracted position.

FIG. 30A shows the same device 3000 with the abutment 3030 in the retracted position with rear face 3034 facing the tire. In this position, the rear wedge 3063 and rear wedge face 3064 are attached at one end of rear face 3034, with rear wedge face 3064 contiguous with rear face 3034. Preferably, rear wedge face 3064 is angled at approximately 45 degrees from the rear face 3034 in the direction of the tire. In this manner, the wedge face contacts the tire only at the intersection of tread and sidewall when the device is in place with the abutment 3030 in contact with the tire. This allows the device to be installed in a manner such that the lateral restraint 3060 is disposed on the outer sidewall of a tire without scuffing the sidewall of the tire. However, the wedge face 3064 is in position to restrain the tire from moving towards the wedge as it moves from side to side due to lateral forces. Front wedge 3061 and rear wedge 3063 may be a unitary member that is formed with the abutment.

The wedge structure in FIGS. 30 and 30A, perform a similar function as the arm 162 and paddle 164 shown in FIG. 5. The front and rear wedges 3061 and 3063 in this second embodiment are easily molded as one piece with the abutment 3030, and does not require the added weight and cost of the arm and paddle arrangement.

Figure 31:
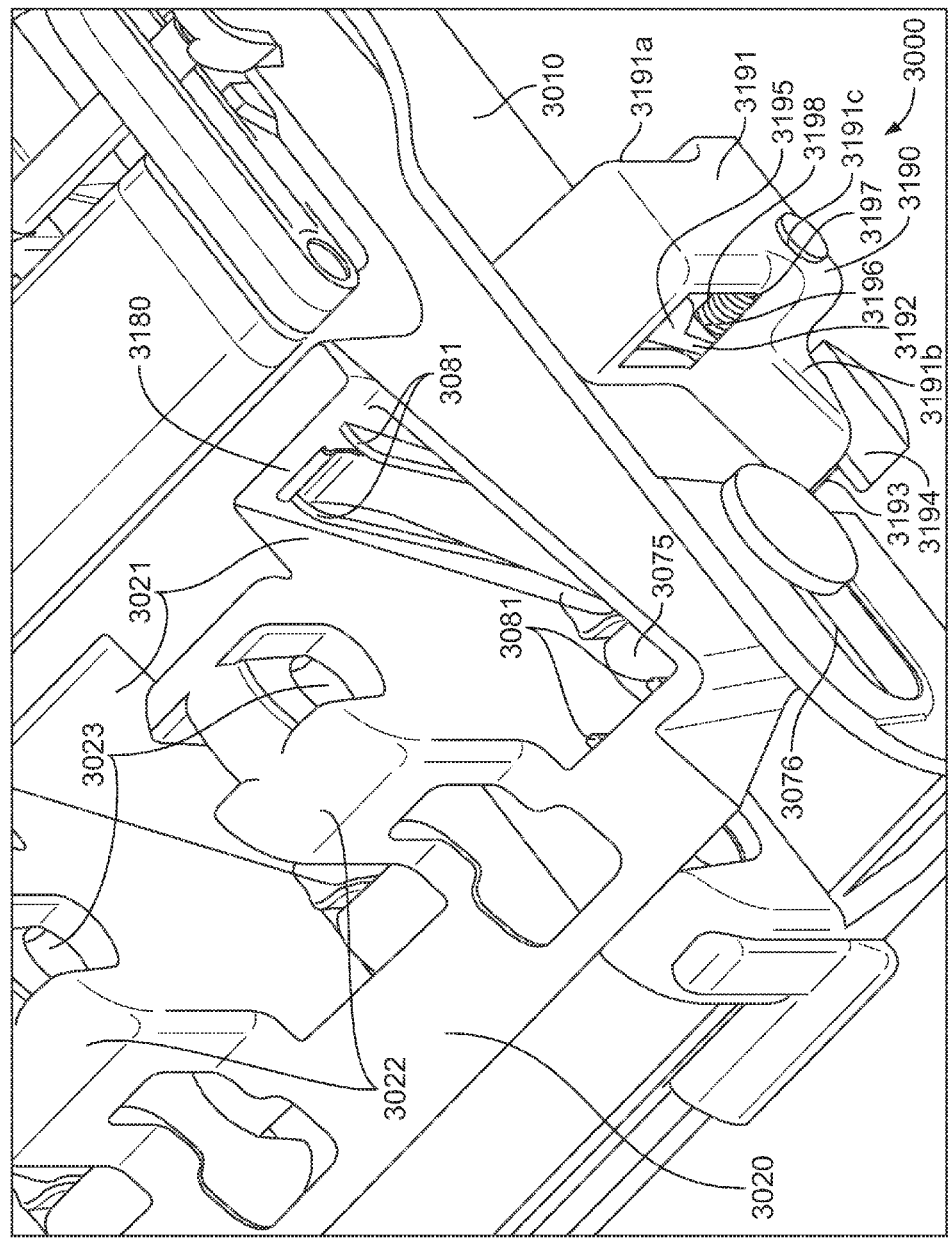
FIG. 31 is an upper left side detail view of the front of restraint device of FIG. 30 with the abutment removed.

Another aspect of this second embodiment of the invention is a positioning spring, which assists in maintaining the abutment in either a retracted or extended position. FIG. 31 shows the second embodiment of the device 3000 of the invention, without the abutment 3030 attached. As can be seen in FIG. 31, the support 3020 has a plurality of recesses 3021 at the front end separated by hinge supports 3022. Each of the hinge supports 3022 has a hole 3023 through which a hinge pin 3070 (not shown in FIG. 31) supports the abutment (not shown in FIG. 31) in a hinged relationship with the support 3020. In at least one of these recesses 3021 is set a positioning spring 3180, which may be formed of a metal strip. The positioning spring 3180 is set in the recess 3021 between guide ribs 3081. The positioning spring in this instance is bent around the base support rod 3075, which travels in aperture 3076 of the base of the device 3000.

Figure 31A:
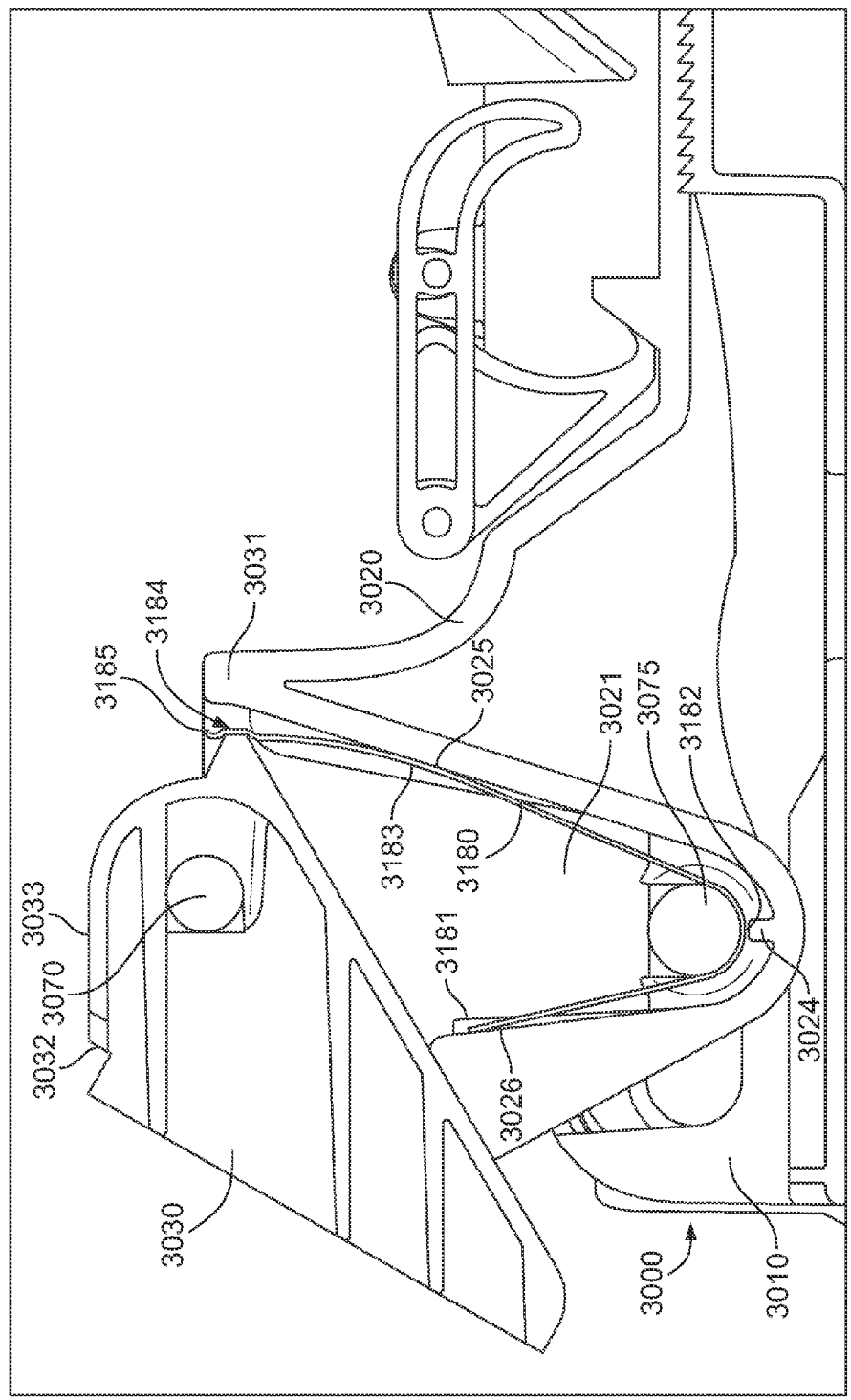
FIG. 31A is a left side cutaway view of the restraint device of FIG. 30 with the abutment in the retracted position.

FIG. 31A shows a side cut-away view of the device 3000 with positioning spring 3180 with abutment 3030 in the retracted position. The positioning spring 3180 in this embodiment is formed of a metal strip formed of a rigid metal with enough flexibility to be deformed and return back to its original shape. The positioning spring is disposed in a recess 3021, and is bent around base support rod 3075, and fits tightly in the space between base support rod 3075 and a rib 3024 extending from the surface of recess 3021.

The position spring 3180 has a first end 3181 that rests against a front wall 3026 of pivot recess 3021, and a middle portion 3182 secured between base support rod 3075 and rib 3024. The positioning spring has a second end 3185 which generally rests near rear wall 3025 of recess 3021. A small detent 3184 is formed in the positioning spring 3180 near the second end 3185. Between the middle portion 3182 and detent 3184 is a fulcrum portion 3183 which rests against rear wall 3025 of the recess 3021. This configuration allows the second end 3185 with detent 3184 to be pushed back towards the rear wall 3025, yet be able to spring back to its original position.

In FIG. 31A, the abutment 3030 is shown in a retracted (down) position. The abutment 3030 has a lug 3031 that fits into detent 3184 of the positioning spring 3180 when it is in the retracted position. In order to move the abutment 3030 out of the retracted position, it will be necessary to rotate the lug 3031 out of the detent 3184, and to push the second end 3185 toward the rear wall 3025. The abutment 3030 will remain in the retracted position absent a force sufficient to deform the spring 3180 and allow the lug 3031 to rotate out of detent 3184.

In FIG. 31B, it can be seen that as abutment 3030 is rotated upward around pin 3070, the lug 3031 presses against spring 3181, causing second end 3185 to deform toward wall 3025. The second end 3185 will return to its original position after the lug 3031 rotates away from the spring 3181.

FIG. 31C is a side cut-away view, showing the abutment 3030 as it approaches the extended (upward) position by being rotated around pin 3070. A surface 3033 of abutment 3030 presses against second end 3185 as the abutment 3030 reaches the extended position, thus causing the second end 3185 to deform toward the wall 3025.

Figure 31D:
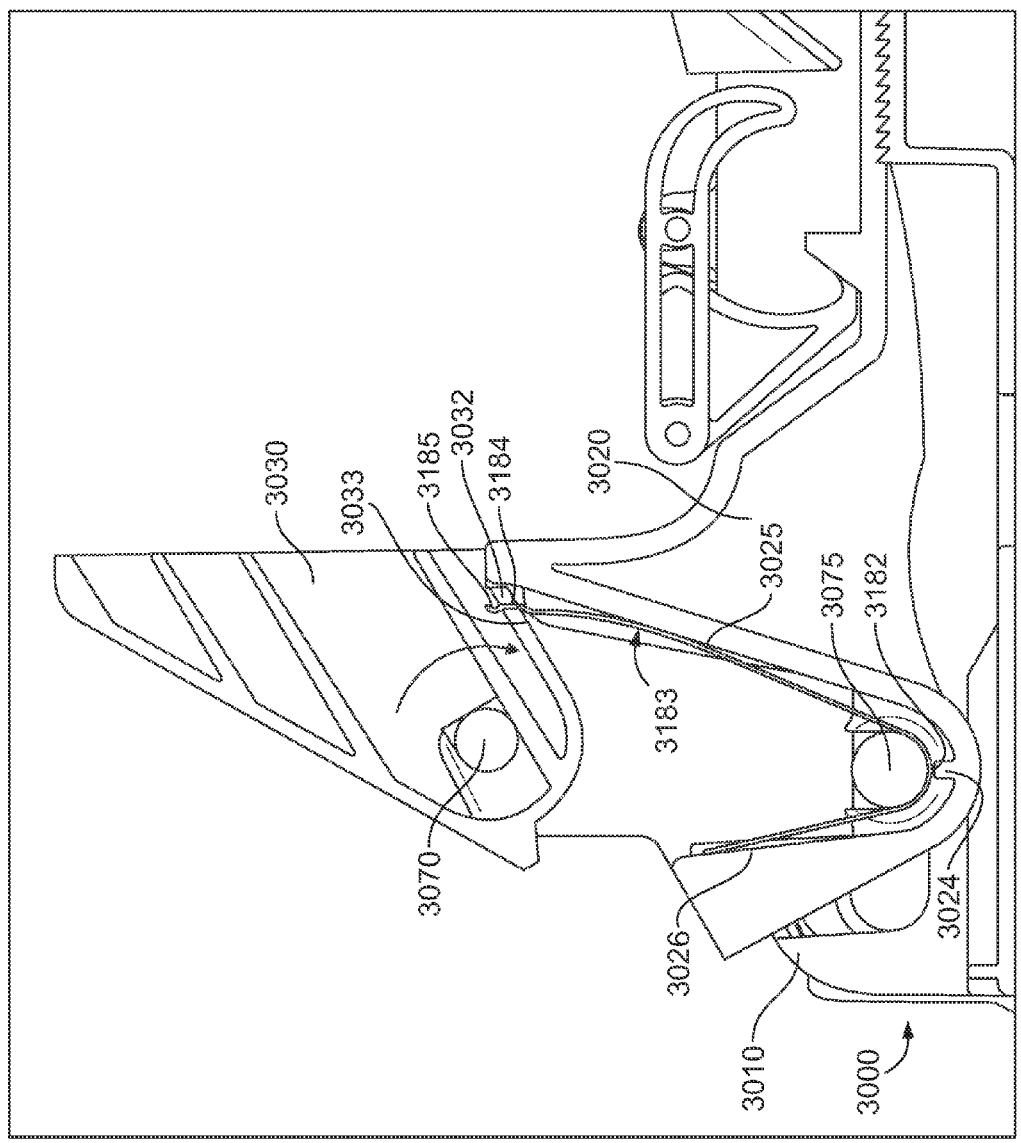
FIG. 31D is a left side cutaway view of the restraint device of FIG. 30 with the abutment in the extended position.

FIG. 31D is a side cut-away view, showing the abutment 3030 in the fully extended position. A notch 3032 is cut out of surface 3033 of abutment 3030. This notch 3032 rests in detent 3184 when the abutment 3030 is in the fully extended position. To disengage the notch 3032 from detent 3184 will require sufficient force to deform the second end 3185 of spring 3180 toward the wall 3025. Therefore, the notch 3032 of abutment 3030 and detent 3184 of spring 3180 serve to maintain the abutment 3030 in the extended position. In order to move the abutment 3030 back to the retracted position, it is necessary to apply sufficient force to abutment 3030 to bend the spring 3180 sufficiently to disengage notch 3032 and detent 3184.

In this manner, the spring 3180 serves to help maintain the chock in either the retracted or extended position, so that at least some small force is required to dislodge the abutment 3030 from either position.

This second embodiment of device 3000 also includes a flag device 3190 for notifying the operator that the device is adequately mounted on the grating, before the operator actuates the activation mechanism to secure the device. As shown on FIGS. 31 and/or 32, device 3000 has a base 3010 with front angled protrusions 3014. The front angled protrusions 3014 must be set within the grating 280 in order for the device 3000 to be fully engaged with the grating 280. The flag device 3190 comprises a partially closed housing 3191 that is mounted on one side of the base 3010. The housing has a rearward opening 3191a that faces rearward of the device 3000, and a sloped hollow 3191b open to the bottom of the device 3000. Mounted in the housing 3191 is a rocker 3192 which comprises a leg 3193, a rounded foot 3194 at an end of the leg 3193, a flag portion 3195, and a hole 3196 disposed between the leg 3193 and flag portion 3195. The rocker 3192 is rotatably mounted to the housing 3191 through a toggle pin 3197 that extends through the rocker hole 3196 and mounts to the housing 3191 through holes 3191c and 3191d (not shown) in the housing 3191. The toggle pin 3197 is secured to the housing by snap ring (not shown). The rounded foot 3194, in its lowered position, extends to approximately the same distance below the base 3010 as the front angled protrusions 3014. The leg 3193 and foot 3194 can move upward around toggle pin 3197. When the device 3000 is not set on the grating, that is, the front angled protrusions 3014 are not engaged with grating 280, the leg 3193 and foot 3194 are in a lowered position, as urged by torsion spring 3198. The torsion spring 3198 is a wire coiled around the toggle pin 3197, with one end of the wire engaging the housing 3191 and the other end of the wire engaging rocker 3192 in such a manner that the leg 3193 and foot 3194 are urged downward at all times.

When the leg 3191 and foot 3192 are in the lowered position, the flag portion 3195 of the rocker 3192 is disposed inside the housing 3191 and out of view of the operator. The flag portion 3195 rests against a wall of housing 3191 in such a manner so as to limit how far the rounded foot 3194 extends below body 3010.

Figure 32:
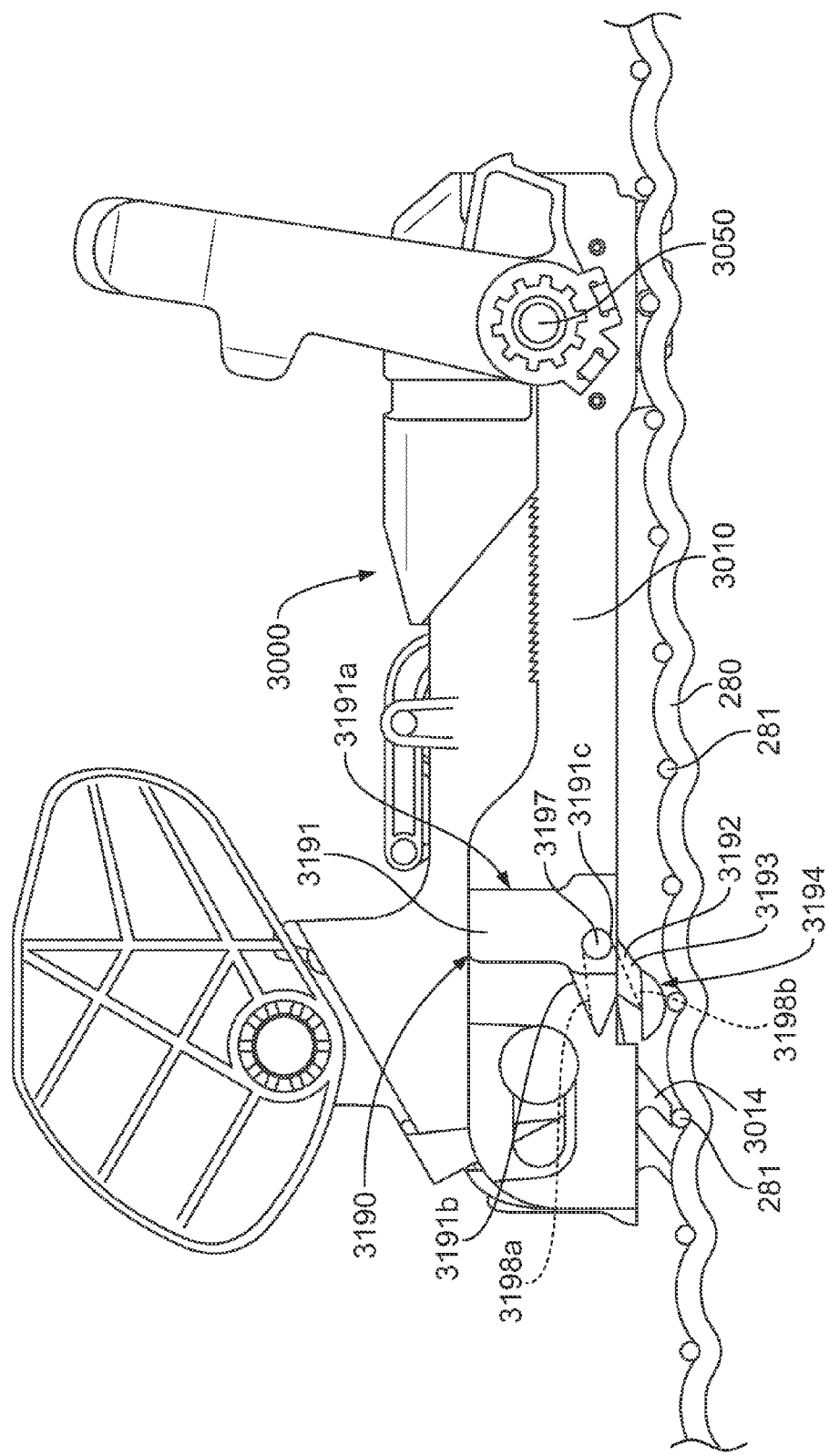
FIG. 32 is a left side view of the restraint device of FIG. 30 with teeth disengaged from a grating.
Figure 32A:
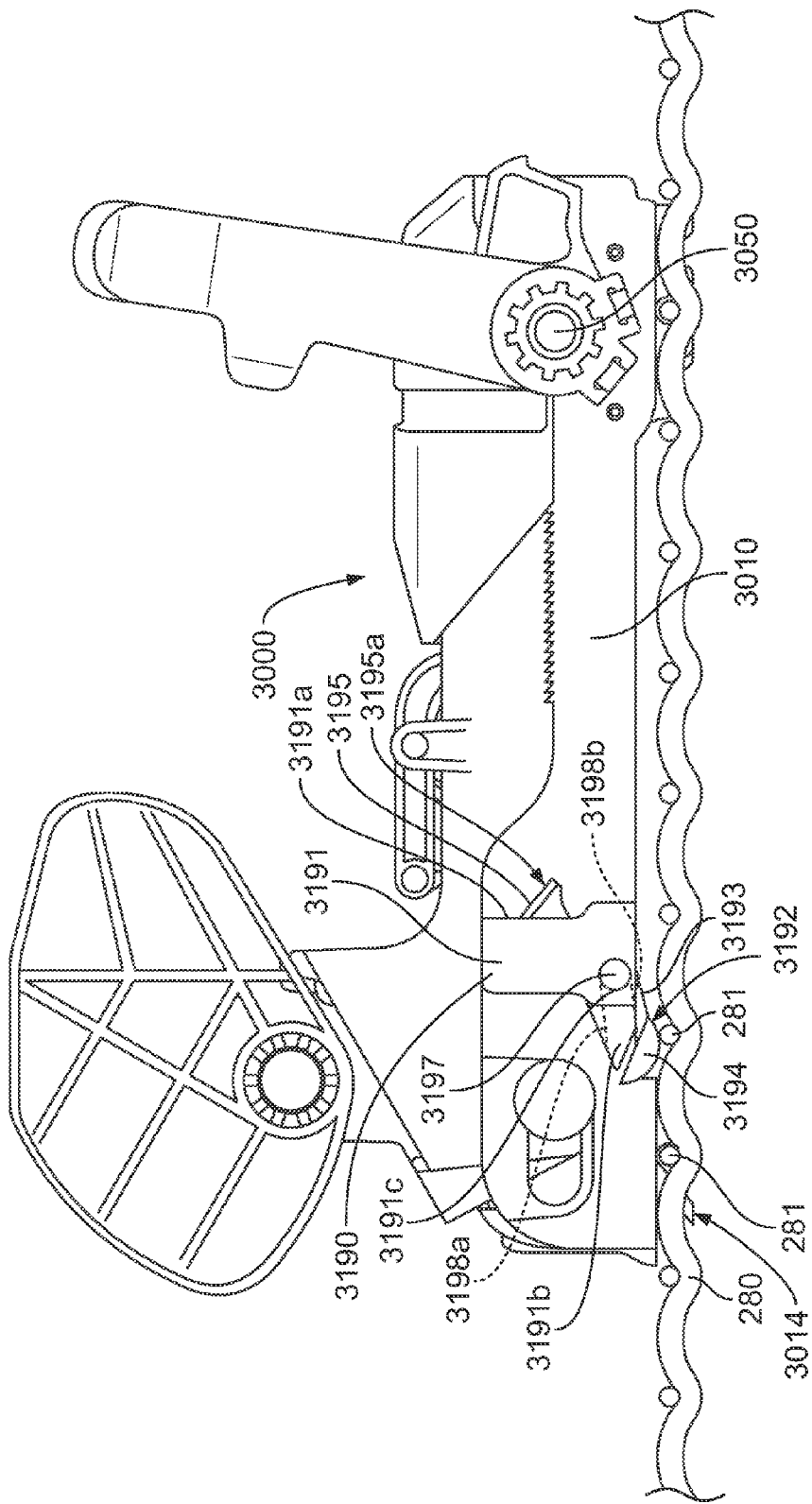
FIG. 32A is a left side view of the restraint device of FIG. 30 with teeth engaged with a grating.

FIG. 32A is a view of the device with the device 3000 with the front angled protrusions 3014 set in grating 280. When the front angled protrusions 3014 are set down and into the grating 280, the rounded foot 3194 is pushed upward by a crossbar 281 of the grating 280. The leg 3193 is thus pushed upward into the sloped hollow 3191b in housing 3191. As the foot 3194 and leg 3193 are pushed up, the rocker 3192 rotates about toggle pin 3197, and flag portion 3195 is rotated around the toggle pin 3197 in the same direction. When the foot 3192 and leg 3191 are fully displaced so that the leg 3191 is disposed in sloped hollow 3191b, the flag member 3195 is rotated out of the opening 3191a in housing 3191 so that a face 3195a of the flag member 3195 is exposed to the operator. The face 3195a may be brightly colored to indicate to the operator that the device is properly set on the grating 280. When the device 3000 is removed out of engagement with grating 280, the leg 3191 and foot 3192 will be urged back downward by the action of torsion spring 3198, causing the rocker 3192 to rotate and retract the flag portion 3195 back inside the housing 3191 and out of view of the operator.

Figure 33:
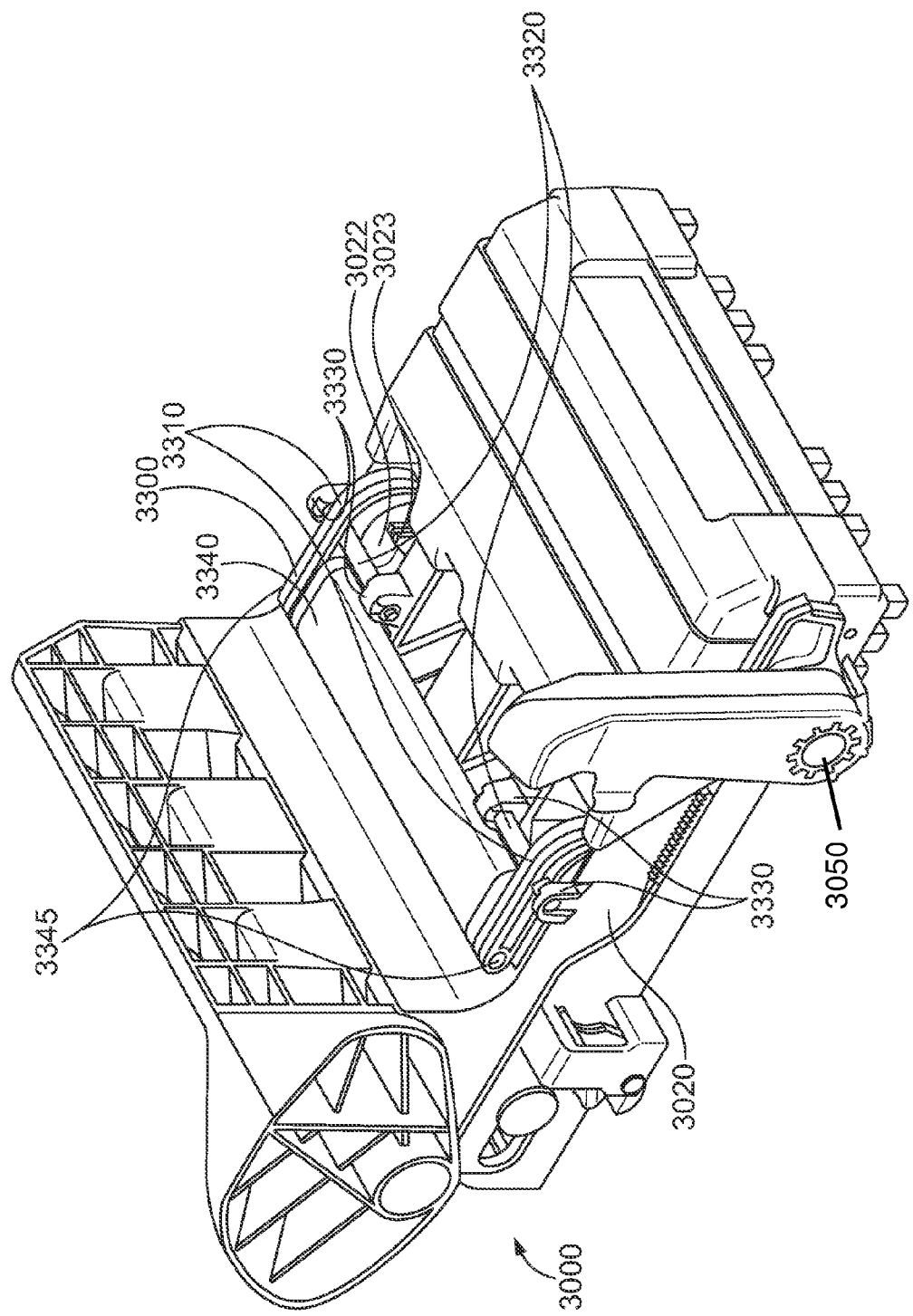
FIG. 33 is a upper rear left side view of the restraint device of FIG. 30 with a handle in its lowered position.

FIG. 33 shows a second embodiment of device 3000 with a lifting handle 3300 to assist the operator in removing the device 3000 from a grating after the activation system 3050 has been rotated, or in placing the device 3300 in position against a tire. The device 3000 has a support 3020 on which is mounted a handle 3300. The handle 3300 is designed to lie flat with support, so that the handle 3300 lies within the safe space 276 (see FIG. 2) under a vehicle, but can be lifted away from the support 3020 so that it may be used for placing and removing the device 3000 in a grating. The handle 3300 includes two curved control arms 3310 each of which has a rotation pin 3320. Each rotation pin 3320 rotatably connects a control arm 3310 to two support sleeves 3330 that are mounted on support 3020. The rotation pins 3320 and support sleeves 3330 are aligned so that the two control arms 3310 rotate around the same axis.

At the end of the control arms 3310 to the front of device 3000 is a grip 3340, which is attached to the control arms through two rotating pins 3345. The grip 3340, when not in use, lies flat along with the control arms 3310 on top of support 3020 so as to remain in safe space 276 (see FIG. 2) when not in use. The grip has two hooks 3348 (not shown in FIG. 33), that lie inside slots 3029 that are formed within support 3020.

The control arms 3310 have curved ends 3350 which curve down into recesses 3025 in support 3020. The recesses 3022 each have a stop 3023.

Figure 33A:
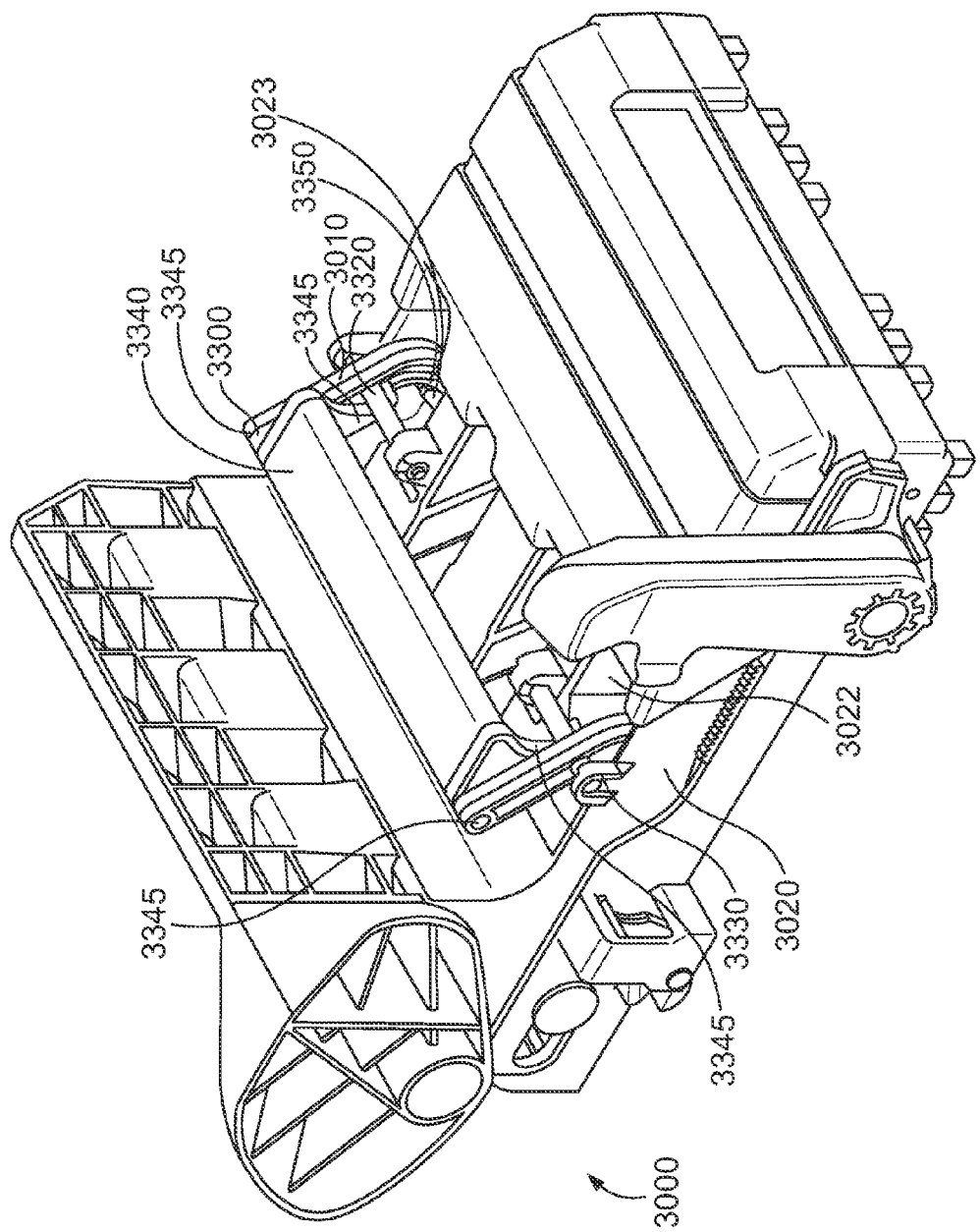
FIG. 33A is a upper rear left side view of the restraint device of FIG. 30 with a handle in its raised position.

FIG. 33A shows the second embodiment of chock 3000 with the lifting handle 3300 in a lifted position. As can be seen, the grip 3340 is able to rotate around pins 3345 to allow for easy handling of the grip by the operator. As the grip 3340 is lifted, curved ends 3350 of the control arms 3310 are rotated downward into recesses 3025 until the curved ends 3350 engage the stops 3023. This provides that once in this lifted position the handle cannot rotate further so that the operator can pull up the chock 3000. At the same time, when the grip is lifted, the hooks 3348 of the grip 3340 hook around the rotating pins 3320. This effectively stops the grip 3340 from freely rotating after it has been lifted, and fixes the position of the grip 3340 with respect to the device 3000. This stabilizes the device 3000 in the operator's hand so that the operator can place the device 3000 in position against a tire.

The handle 3330 is weighted so that once the operator releases the grip 3340, the handle will falls back to the original position shown in FIG. 33, flush with the surface of support 3020, under the force of gravity.

While various embodiments have been described, it will be apparent to those of ordinary skill in the art that many more embodiments and implementations are possible within the scope of the invention. Accordingly, the invention is not to be restricted except in light of the attached claims and their equivalents.

What is claimed is:

1. A restraint device for securing a tire to an apertured surface, the device comprising:
    a body capable of being secured on the apertured surface in proximity to a tire of a vehicle;
    an abutment disposed at a front end of the body and coupled to the body by a hinge;
    wherein the abutment may be pivoted to an extended position above the body and a retracted position, wherein the abutment in the extended position has a front face configured to engage the tread of the tire, and the abutment in the retracted position has a rear face configured to engage the tread of the tire; and
    a lateral restraint integrally formed with the abutment and configured to prevent lateral movement of the tire;
    wherein the lateral restraint has a front oblique face extending at an oblique angle from the front face of the abutment toward the tire when the abutment is in the extended position, and a rear oblique face extending at an oblique angle from the rear face of the abutment toward the tire when the abutment is in the retracted position, and
    wherein the lateral restraint is attached only to the abutment and not to the body.

2. The restraint device according to claim 1, wherein the body comprises:
    a base that is secured to the apertured surface; and
    a support to which the abutment is coupled by the hinge, wherein the base and support are slidably connected to one another.

3. The restraint device according to claim 1, wherein the lateral restraint is in the shape of a wedge.

4. The restraint device according to claim 1, wherein the front oblique face is configured to contact the tire only at an intersection of a sidewall and tread when the abutment is in the extended position, and the rear oblique face is configured to contact the tire only at an intersection of a sidewall and tread when the abutment is in the retracted position.

5. The restraint device according to claim 1, further comprising a handle that lies flat against the body of the restraint device when not in use, and which may be lifted upward to assist in removing the restraint device from the apertured surface or in placing the restraint device on the apertured surface.

6. The restraint device of claim 1, wherein the front face of the abutment in the extended position and the rear face of the abutment in the retracted position are configured to engage tires of different sizes.

7. The restraint device of claim 6, wherein the front face of the abutment in the extended position is configured to engage a larger tire than the rear face of the abutment in the retracted position.

8. A restraint device for securing a tire to an apertured surface, the device comprising:
    a body capable of being secured on the apertured surface in proximity to a tire of a vehicle;
    an abutment disposed at a front end of the body and coupled to the body by a hinge;
    wherein the abutment may be pivoted to an extended position above the body, and a retracted position extending toward the apertured surface, wherein the abutment has a front face configured to engage the tread of the tire in the extended position, and the abutment has a rear face configured to engage the tread of the tire in the retracted position; and
    a positioning spring attached to the body, wherein the positioning spring is configured to urge the abutment into either the extended position or the retracted position.

9. The restraint device according to claim 8, wherein the positioning spring is a flexible metallic spring with a detent that engages a lug or a notch in the abutment when the abutment is in the extended position or the refracted position, and wherein the abutment is configured to deform the spring when the abutment is moved from the extended or the retracted position.

10. A restraint device for securing a tire to an apertured surface, the device comprising:
    a body having downwardly depending clamping teeth, the clamping teeth configured to be set inside apertures of the apertured surface;
    an abutment on the front of the body configured to engage a tread of a tire and prevent the tire from moving on the apertured surface; and
    an indicating mechanism attached to the body having a hidden position to indicate to an operator that the clamping teeth are not set inside the apertures of the apertured surface, and an exposed position to indicate to an operator that the clamping teeth are set inside the apertures of the apertured surface.

11. The restraint device according to claim 10, wherein the indicating mechanism comprises:
    a rocker having a foot and a flag portion, the rocker being rotatably connected to the body by a pin, the rocker substantially disposed inside a housing,
    wherein the foot of the rocker extends to a lower position below the body when the clamping teeth are not set in the apertured surface, and wherein the foot is configured to be pushed upward to an upper position toward the body by the apertured surface when the clamping teeth are set in the apertured surface,
    wherein the flag portion of the rocker is in a hidden position in the housing when the clamping teeth are not set in the apertured surface, and
    wherein the rocker rotates around the pin so that the flag portion is outside of the housing in the exposed position when the foot is pushed to the upper position by the apertured surface.

12. The restraint device according to claim 11, further comprising a spring that urges the foot toward the lower position when the foot is not pushed upward by the apertured surface.

13. The restraint device of claim 8, wherein the front face of the abutment in the extended position and the rear face of the abutment in the retracted position are configured to engage tires of different sizes.

14. The restraint device of claim 13, wherein the front face of the abutment in the extended position is configured to engage a larger tire than the rear face of the abutment in the retracted position.

* * * * *